United States Patent [19]
Stearns et al.

[11] Patent Number: 5,475,803
[45] Date of Patent: Dec. 12, 1995

[54] METHOD FOR 2-D AFFINE TRANSFORMATION OF IMAGES

[75] Inventors: Charles C. Stearns; Karthikeyan Kannappan, both of San Jose, Calif.

[73] Assignee: LSI Logic Corporation, Milpitas, Calif.

[21] Appl. No.: 911,832

[22] Filed: Jul. 10, 1992

[51] Int. Cl.⁶ .................................................. G06T 3/00
[52] U.S. Cl. ......................... 395/136; 395/137; 395/138; 395/139; 345/126; 345/127
[58] Field of Search ..................................... 395/136, 137, 395/138, 139, 132; 345/121, 126, 127, 131; 382/44, 45, 46, 47

[56] References Cited

U.S. PATENT DOCUMENTS

| | | | |
|---|---|---|---|
| 3,976,982 | 8/1976 | Eiselen | 395/136 X |
| 4,283,765 | 8/1981 | Rieger | 395/136 X |
| 5,175,808 | 12/1992 | Sayre | 395/136 X |
| 5,295,237 | 3/1994 | Park | 395/136 X |

OTHER PUBLICATIONS

Kannappan et al. "An Interleaved Scanline Algorithm for 2-D Affine Transformations of Images".

*Primary Examiner*—Mark K. Zimmerman
*Attorney, Agent, or Firm*—Poms, Smith, Lande & Rose

[57] ABSTRACT

Affine image transformations are performed in an interleaved manner, whereby coordinate transformations and intensity calculations are alternately performed incrementally on small portions of an image. The pixels are processed in rows such that after coordinates of a first pixel are determined for reference, each pixel in a row, and then pixels in vertically adjacent rows, are processed relative to the coordinates of the previously processed adjacent pixels. After coordinate transformation to produce affine translation, rotation, skew, and/or scaling, intermediate metapixels are vertically split and shifted to eliminate holes and overlaps. Intensity values of output metapixels are calculated as being proportional to the sum of scaled portions of the intermediate metapixels which cover the output pixels respectively.

2 Claims, 14 Drawing Sheets

PRIOR ART

METHOD FOR 2-D AFFINE TRANSFORMATION OF IMAGES

TECHNICAL FIELD OF THE INVENTION

The invention relates to image processing systems, and more particularly to affine image transformation of bit-mapped images on computer graphics systems.

BACKGROUND OF THE INVENTION

The use of computer graphics has grown dramatically in recent years, with numerous military, industrial, medical, commercial and consumer applications. Some such applications include computer image enhancements, flight trainers and simulators, medical imaging (e.g., CAT scanners), commercial video processing systems, video games, home computers, and many more. Image transformations redefine the spatial relationships between picture elements (pixels) in an image. Many of these systems make use of a class of image transformations called "affine" image transformations. An affine transformation (hereinafter referred to interchangeably as "transformation", and "affine image transformation") is any transformation which preserves the parallelism of lines in the input and output images. Such transformations include the operations of scaling in either or both dimensions, translation (moving), or rotation. These operations may be performed on an entire image or on any part thereof.

Image transformation is a growing branch of image processing and has also been called "Image Warping". Geometric transformation of images is of great practical importance in remote sensing (distortion correction), medical imaging (image registration), computer vision (image processing), and computer graphics, where the primary application of transformations is in texture mapping (mapping of "texture" patterns onto displayed objects), and in the creation of interesting visual effects that have always attracted the entertainment industry.

Such transformations typically operate on an image in an image space which is composed of a rectilinear array of pixels. A pixel typically has a location and an intensity value associated with it. The location component of a pixel is a pair of coordinates identifying its location within an image space. The intensity value may be either a scalar quantity (e.g., for monochrome image which only require a measure of lightness/darkness), a vector quantity (e.g., for expression of a color intensity value as a vector whose components are HUE, SATURATION, and LIGHTNESS), or as a multiple value (e.g., for storage of color values as separate RED, GREEN, and BLUE intensity values). It is generally assumed that these pixels either have fixed dimensions or that they represent an area having fixed dimensions.

Pixels are generally associated with a signal of some type, because as elements of an image, they are intended to be displayed at one point or another. A pixel may be one signal in a serial stream of signals composing a video signal, or a stored value in an image memory (RAM, ROM, disk file, serial memory, or any other suitable storage medium) or used to hold a digital representation of an image for a display system. Typically, a pixel's location (coordinates) in an image of which it is a part is implicit in its position in image memory. A stored representation of an image has an organization associated with it that dictates how and where in image memory a pixel is stored. In order to read the intensity value for a pixel at a specific location within a stored image, it is necessary to access the location within the image storage medium which represents that specific location within the image.

Pixel locations in a serial video signal (stream) are typically encoded as a time offset from a synchronizing reference pulse in the stream, or from a synchronizing reference pulse on a separate line. Each pixel in an image has an allocated time slot within a video signal. At the time allocated to a particular pixel, the video signal is made equal to a signal level representing that particular pixel's intensity value. A particular pixel within a video signal may be accessed by measuring the video signal value (or intensity and chroma values, in the case of color video) at the time slot allocated to that particular pixel.

Herinafter, all discussions of "pixels" will assume that a pixel is associated with a signal which may used to display a piece of an image on a display system, that pixels have a height and a width, a location in an image expressed as rectangular coordinates, and that pixels have an intensity value associated with them.

Image transformations can be simple translations (moving an image from one point on a display to another) or complicated warping. Many present research efforts are aimed at increasing the speed of transformations such as these.

A class of transformation technique which has grown in popularity due to its speed and realizability is the scanline method, wherein an image is processed on-the-fly as it is scanned for display on a raster scan device such as a CRT (cathode ray tube) display. Such methods find practical realizations in real-time hardware for video effects, texture mapping, geometric correction, and interactive image manipulation. Even the relatively straightforward scanline methodology often requires elaborate high-speed computing hardware including digital multipliers, and large amounts of temporary image storage. There is always a desire to accomplish the same ends in a simpler, less expensive manner.

Geometric transformation map one coordinate system onto another, based upon spatial transformation mapping functions. Sometimes transformation functions can be expressed as a set of simple analytic expressions. Other times it is necessary to use more elaborate forms of description (e.g., a sparse lattice of control points). The general mapping function can be given in two forms: either relating a point in an output coordinate system (in x and y, for example) to a corresponding point in an input coordinate system (in u and v, for example), or vice versa, as shown in the following equations (1) and (2), respectively:

$$(x,y) = [X(u,v), Y(u,v)] \quad (1)$$

or $$(u,v) = [U(x,y), V(x,y)] \quad (2)$$

In these equations, functions X and Y map an input pixel (u, v) to its corresponding output pixel (x, y) while functions U and V map the output pixel (x, y) back to its corresponding input pixel (u, v).

FIG. 1a shows an example of a translation transformation, whereby a rectangular block of pixels 112 within an input image 110 is operated upon by a translation transformation such that without altering its orientation, a corresponding rectangular block of pixels 116 appears in a different location in an output image 114.

FIG. 1b gives an example of image rotation, whereby an input block of pixels 122 within an input image 120 is operated upon by a rotation transformation producing a rotation of the corresponding rectangular block of pixels 126 in an output image 124.

FIG. 1c demonstrates scaling (contraction and expansion, whereby an input rectangular block of pixels 132 in an input image 130 is squeezed in the horizontal direction while being stretched in the vertical direction by scaling the distances between input pixels in a corresponding rectangular block of pixels 136 in output image 134 by one factor in the horizontal dimension and by another factor in the vertical dimension.

FIG. 1d demonstrates a "shear" transformation, whereby an input rectangular block of pixels 142 in input image 140 is operated upon by a shear transformation to produce a corresponding parallelogram-shaped block of pixels 146 in output image 144. Assuming an input image in UV coordinate space with each point represented by a "U" and "V" coordinate, (u, v), and an output image in XY coordinate space with each point represented by an "X" and a "Y" coordinate, (x, y), these transformations are defined mathematically as follows:

Translation of (u, v) by an amount $(T_U, T_V)$ $$x = u + T_U$$
$$y = v + T_V \quad (3)$$

Scaling of (u, v) by an amount $(S_U, S_V)$ $$u = u \times S_U$$
$$v = v \times S_V \quad (4)$$

Rotation of (u, v) by an angle θ

$$x = u \times \cos(\theta) + v \times \sin(\theta)$$
$$y = v \times \cos(\theta) - u \times \sin(\theta) \quad (5)$$

Shearing of (u, v) along the horizontal by a shear factor a $$x = u + a \times v$$
$$y = v \quad (6)$$

Shearing of (u, v) along the vertical by a shear factor b
Well known to those skilled in the art of graphic image $$x = u$$
$$y = v + b \times u \quad (7)$$

processing is a technique by which affine transformations may be expressed as a matrix operation whereby the location of each point, input and output, is expressed as a 3 wide by 1 high vector quantity. Every output point location is equal to the vector product of its corresponding input point's vector quantity and a 3 by 3 transformation matrix. This operation is expressed as follows:

$$[x\, y\, 1] = [u\, v\, 1] \begin{bmatrix} \alpha & \beta & 0 \\ \gamma & \delta & 0 \\ \epsilon & \zeta & 1 \end{bmatrix} \quad (8)$$

In the matrix shown in equation (8), the ε and ζ matrix coefficients control translation in the horizontal and vertical directions, respectively; the α β, τ, and δ matrix coefficients control scaling, rotation, and shearing.

Also well known to those skilled in the art is the method by which the affine transformation parameters of equations (3) through (7) may be combined to form constant matrix coefficients. Cascaded transformation matrix operations may be compressed into a single transformation matrix which also has constant matrix coefficients.

The foregoing discussion of matrix coefficients assumes that matrix algebra is used to determine the numbers of interest. In fact, three by three transformation matrices have become a sort of standard form of notation for expressing 2-D image transformations. However, matrix algebra is merely a convenient shorthand technique for performing what would otherwise be a tedious series of algebraic manipulations. Of course, any equivalent ordinary algebraic technique could be substituted for the matrix algebra.

Traditionally, there have been two approaches to transformations: forward mapping, where the input is mapped to the output (as in functions X and Y in (1) ), and inverse mapping, where the output is mapped to the input (as in U and V of (2) ). Equations (3)–(8) are representative of affine transformation from a forward-mapped perspective, whereby output pixel locations are expressed as a function of input pixel locations.

Forward mapping interpolates each input pixel into the output image at positions determined by the mapping functions. This mapping can generate "holes" and "overlaps" in the output image when mapped pixels either incompletely fill or over-fill the corresponding output image. This is due to alterations in the relative position of adjacent pixels as a result of the transformation process which can leave gaps or overlapping areas. Such artifacts have been overcome by using methods such as the four-corner mapping paradigm as disclosed in: Wolberg, G., "Digital Image Warping", IEEE Computer Press Monograph, IEEE Catalog Number EH0322-8, 1990. In this method, the intensity of the output pixel is the sum of all of the input intensities scaled by the amount of the output area covered by each input pixel. The calculation of output intensities is typically performed after the completion of mapping. An accumulator array is required to properly integrate all the contributing input intensities. Typically, there is one accumulator per pixel of the output image, effectively requiring another complete frame buffer. Similar schemes for determining output pixel intensities are used in many transformation methods of the prior art. "Intersection tests" for area coverage, filtering to handle magnification, and the requirement for an accumulator array are the major drawbacks of this approach. Forward mapping is generally most useful when the input image must be read sequentially, or when it does not reside in memory. This is because in forward mapping, the output placement of pixels is described in terms of the input placement of pixels, allowing the input image to be processed as it is received, in any necessary order, such as in a raster scan fashion. Forward mapping requires that there be random access to the output image.

Inverse mapping works on the discrete output domain, projecting each output pixel onto quadrilaterals in the input domain. In this method, an accumulator array is not required, and all of the output pixels are computed. But, there is the possibility of skipping pixels when sampling the input, thus requiring filtering in the output domain. Clipping is natural to inverse mapping, unlike forward mapping. Inverse mapping is used where the input image is stored in memory and can be accessed in random order as required by the order of output pixel processing.

The 2-dimensional (or 2-D) nature of forward and inverse mapping complicates some computations (filtering, sampling, and reconstruction, for example). Fortunately, some transformations are separable, that is, the computations can be performed in one dimension at a time. Separable mapping exploits the characteristics of certain transformations, and decomposes the forward mapping function into a series of orthogonal 1-D (one dimensional) transformations, thus allowing the use of simple digital filtering and reconstruction. The execution to one-dimensional transformations often is accomplished using "scale" and "shear" operations. "Scaling" in one dimension, simply states that one dimension of the output image space translates to a fixed multiple of one dimension of the input image space. "Shearing" in one dimension involves skewing an image along one axis such that a rectangular-shaped array of pixels in the input image space becomes a parallelogram-shaped array of pixels in the output image space. Some 1-D transforms combine scaling and shearing into a single operation.

One advantage of 2-D image transformations which are separated into two 1-D image transformation is that the image can be read in row/column order (e.g., in "scanline" fashion), providing efficient data access and substantial savings in I/O time over techniques which require an image to be loaded in memory before processing. Another advantage of this approach is that it can be implemented with great ease in a pipeline structure, facilitating the its implementation in real-time video processing hardware.

Many multi-pass scanline methods operating in a sequential row/column fashion are separable into 1-D components. Examples of such methods may be found in: Weizman, Carl F. R., "Continuous Anti-aliased Rotation and Zoom of Raster Images", Computer Graphics, (SIGGRAPH '80 Proceedings), vol. 14, no. 3, pp. 286–293, July, 1980, which describes a four-pass scale/shear method; Catmull, E. and A. R. Smith, "3-D Transformation of Images in Scanline Order," Computer Graphics, (SIGGRAPH '80 Proceedings), vol. 14, no. 3, pp. 279–285, July, 1980, hereinafter referred to as Catmull-Smith, which describes a two-pass scale/shear method, hereinafter referred to as the Catmull-Smith method; Paeth, Alan W., "A Fast Algorithm for General Raster Rotation," Graphics Interface '86, pp. 77–81, May 1986, which describes a three-pass shear method; and Tanaka, A., M. Kameyama, S. Kazama, and O. Watanabe, "A Rotation Method for Raster Images Using Skew Transformation", Proc. IEEE Conference on Computer Vision and Pattern Recognition, pp. 272–277, June, 1986, which also describes a three-pass shear method. The most general of these of these is the Catmull-Smith method, which takes a two-pass approach.

The Catmull-Smith method performs a variety of image transformations on digital images in two passes. Catmull-Smith discusses texture mapping onto 2-D representations (projections) of 3-D surfaces using this approach. In this technique, a 2-D texture surface is transformed as a 2-D image until it conforms to a projection of a polygon placed arbitrarily in 3-D space. This 2-D transformation is decomposed into two simple orthogonal 1-D transformations, one applied to the input image on a row basis in a first pass called the "h-pass", and the second applied to the input image on a column basis in a second pass called the "v-pass". FIG. 2 illustrates this concept of decomposition of a two dimensional transformation into two 1 dimensional transformations and contrasts it to a single two dimensional transformation.

With respect to FIG. 2, a representative point "(u, v)" 205 in an input coordinate space "UV" 210, is to be operated upon by a transformation process to produce a corresponding representative point "(x, y)" 215 in an output coordinate space "XY" 220. A reference two dimensional transformation as described in equation (1) and indicated in FIG. 2 as "X(u,v)" and "Y(u,v)" (230), representing a forward-mapping function, produces point (x, y) 215 directly, but with considerable computational complexity, as described previously. The two dimensional transformation 230 may be decomposed into two 1-D transformations $F_v(u)$ (250) and $G_x(v)$ (260), which are applied sequentially. In between the two operations, a representative intermediate point "(x, v)" (240) is produced in an intermediate "XV" coordinate space 245.

In the first pass, or h-pass, one part of the forward mapping function 230, X(u,v) is applied to each row of the input image, maintaining the "v" coordinate as a constant for each row. The result of this pass is an intermediate image that has the same x coordinates as the final output image; only the y coordinates have been computed. This one-dimensional application of X(u,v) can be written as $F_v(u)$ (250), as follows:

$$(x,v) = (F_v(u),v) = (X(u,v),v) \tag{9}$$

This maps every point (u, v) 205 of an input image in UV space 210 onto a point (x, v) 240 in an intermediate XV coordinate space 245.

Of course, it is possible to perform the first pass on the other axis first, in which case, a function $G_U(v)$, equivalent to Y(u,v) with "u" held constant would be used producing an intermediate point (u,y). In a separable mapping of this type, the order of 1-D processing is arbitrary.

In a second pass, or v-pass, the other part of the two dimensional transformation 230, Y(u, v) is applied to the intermediate image produced in the h-pass. The fact that this intermediate image is in XV coordinate space (245) complicates the v-pass somewhat. The function Y(u, v) is designed to produce Y coordinates of points in XY (220) space from corresponding points in UV space (210). But since the intermediate image is in XV space (245), as is representative point (x,v) 240, an auxiliary function is required. This function, $H_x(v)$ is an expression of a "u" coordinate as a function of a "v" coordinate, while keeping an "x" coordinate constant, that is: $u=H_x(v)$. This auxiliary function is determined by solving the equation:

$$X(u,v)-x=0 \text{ where x is constant} \tag{10}$$

for "u" over all "v", holding x constant

The second pass, or v-pass, may now be expressed as the application of the following equation to the intermediate image:

$$(x,y) = (x, G_x(v)) = (x, Y[H_x(v),v]) \tag{11}$$

on a column by column basis, holding x constant for each column. This pass maps every point (x, v), (illustrated by 240 in FIG. 2) in the intermediate image in intermediate coordinate space 245 into a point (x, y) (illustrated by 215 in FIG. 2) in the output image in output coordinate space 220.

There are, unfortunately, a few problems inherent with the Catmull-Smith method. One such problem is that after the h-pass, it is possible for the input image to collapse into a line in the intermediate image for some transformations. An example of such a transformation is a 90 degree rotation, wherein every row of points in the input image will collapse to a single point in the intermediate image. The resulting finished intermediate image will comprise only a straight line. The loss of information in this case is great enough that the subsequent v-pass is unable to complete the transformation and is reduced to a meaningless computation. This problem is generally known as the "bottleneck" problem. Catmull-Smith suggests a solution based upon a change of input coordinates, the difficulties of which are discussed in Wolberg, G. and Terrance E. Boult, "Separable Image Warping with Spatial Lookup Tables," Computer Graphics, (SIGGRAPH '89 Proceedings), vol. 23, no. 3, pp. 369–378, July, 1989.

Another problem inherent in the Catmull-Smith method, and with most other 2-pass methods, is the need for an intermediate image buffer, which can be bulky and expensive, especially in real-time video processing systems.

A third problem with the Catmull-Smith method is that the need for an auxiliary function $H_x(v)$ represents a significant computational complexity.

Other problems of the Catmull-Smith method include: the requirement for a significant number of multiplications. Multiplication generally require a great deal more time or a great deal more hardware than additions. If a method were available which used only additions and a minimal amount of intermediate image storage, there would be a very significant savings in time and/or hardware complexity. Of course, lower hardware complexity generally implies lower cost.

DISCLOSURE OF THE INVENTION

It is therefore an object of the present invention to provide an improved technique for transforming input images in an input image space into output images in an output image space without the use of an auxiliary function;

it is a further object of the present invention to provide a technique for transforming input images in an input image space into output images in an output image space without iterative multiplications;

it is a further object of the present invention to provide a technique for transforming input images in an input image space into output images in an output image space without storage of a complete intermediate image;

it is a further object of the present invention to provide a technique for transforming input images in an input image space into output images in an output image space such that image collapse (loss of information preventing restoration of the image) does not occur for angles of rotation approaching odd multiples of 90 degrees.

According to the invention, affine image transformations are performed in a interleaved fashion, whereby coordinate transformations and intensity calculations are alternately performed incrementally on small portions of an image. An input image in an input image space and input coordinate system comprising an array of unit input pixels is to be transformed into an output image in an output image space and output coordinate system comprising an array of unit output pixels. An order of processing of input pixels is chosen such that input pixels are processed in vertical or horizontal rows and such that after a first pixel, each subsequent pixel is adjacent to a previously processed input pixel. Coordinate computation is based on parameters of a transformation matrix such as that shown in equation (8) (which parameters may also be determined by any equivalent algebraic method) and on previously computed coordinates, producing a set of intermediate output metapixels in the output image space and output coordinate system which correspond on a one-to-one basis with the pixels of the input image.

Prior to coordinate transformation, the image transformation is analyzed for any rotation component. If the rotation component is outside the range of +45 degrees to −45 degrees, a rotation factor equal to an integer multiple of 90 degrees is subtracted from the rotation component of the transformation to bring the effective rotation component within the +45 to −45 degree range, and the value of this temporary rotation factor is noted for final image restoration. In this manner, an image transformation may be performed where rotation components are never greater than 45 degrees, while the resultant image in output image space reflects the orignal rotation component. The intermediate output metapixels resulting from coordinate transformation are scaled in the horizontal and vertical, do not necessarily match the size of the unit output pixels, do not necessarily align with output pixel boundaries, and may have holes and/or overlaps between them. Any such holes and overlaps are eliminated by moving all intermediate output metapixels in the vertical direction by an amount which brings their boundaries flush with the boundaries of adjacent intermediate output metapixels above and below. Intermediate output metapixels which straddle a vertical output pixel boundary are split into two sub-metapixels, only one of which is moved. An output pixel's intensity is determined based upon the intensity(ies) of input pixel(s) scaled by the amount of the output pixel which is covered by the input pixel's (pixels') corresponding intermediate output metapixel(s).

In one embodiment of the invention, input pixels are processed in scanline order, whereby subsequent rows of pixels are processed in the same direction as previous rows, e.g., if a first row is processed from left to right, then all subsequent rows will be processed from left to right.

In another embodiment of the invention, input pixels are processed in a serpentine order, whereby subsequent rows of pixels are processed in alternating directions, e.g., if a first row is processed from left to right, then a second row is processed from right to left, a third row is processed from left to right, etc.

In this manner, the objects are achieved. Other objects, features and advantages of the invention will become apparent in light of the following description thereof.

DETAILED DESCRIPTION OF THE INVENTION

Figure 1A:
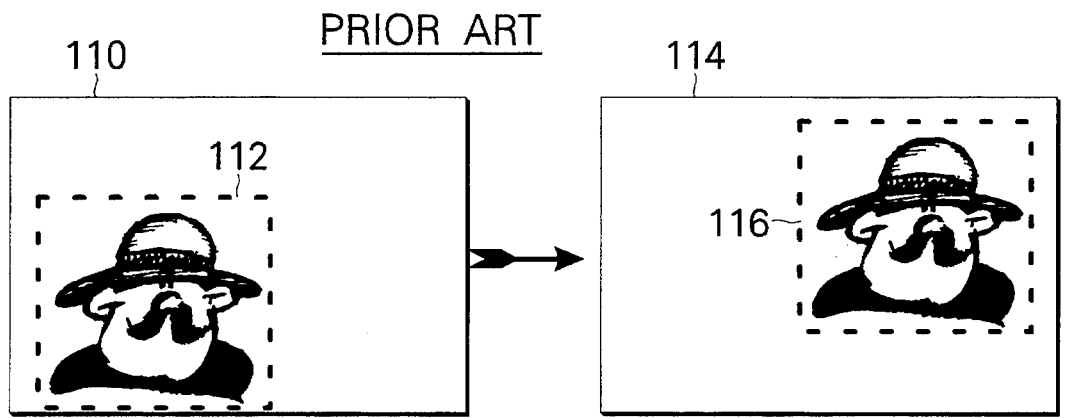
FIGS. 1a–1d are illustrations of the four basic types of 2-D affine image transformations in the prior art.
Figure 1B:
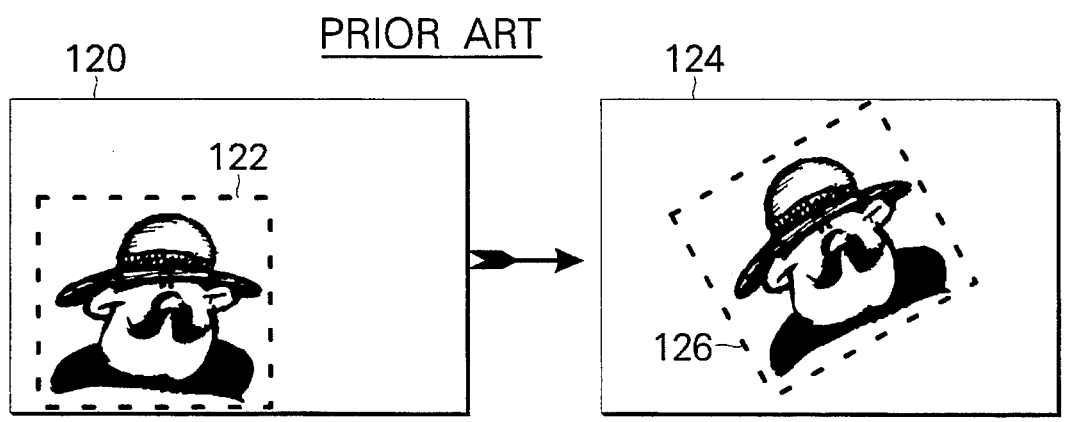
Figure 1C:
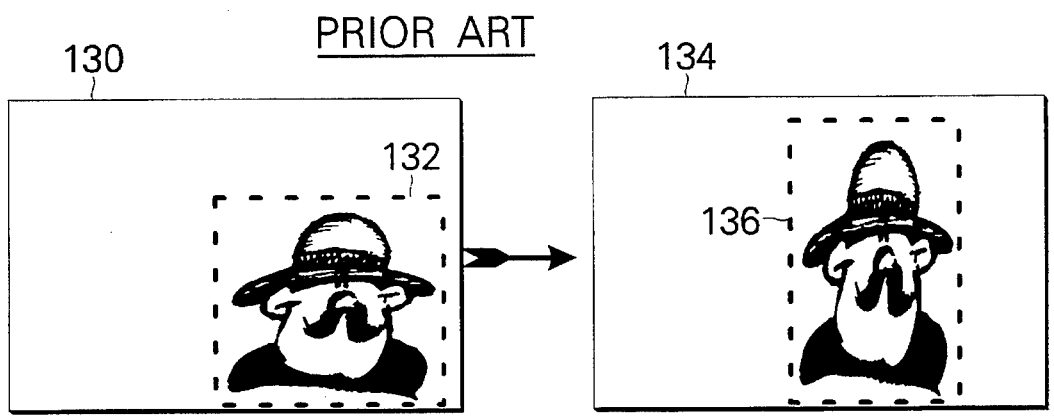
Figure 1D:
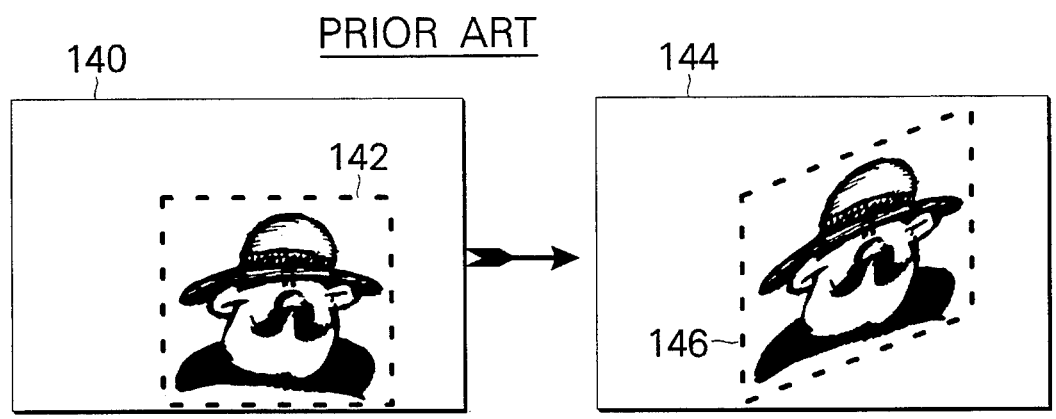
Figure 2:
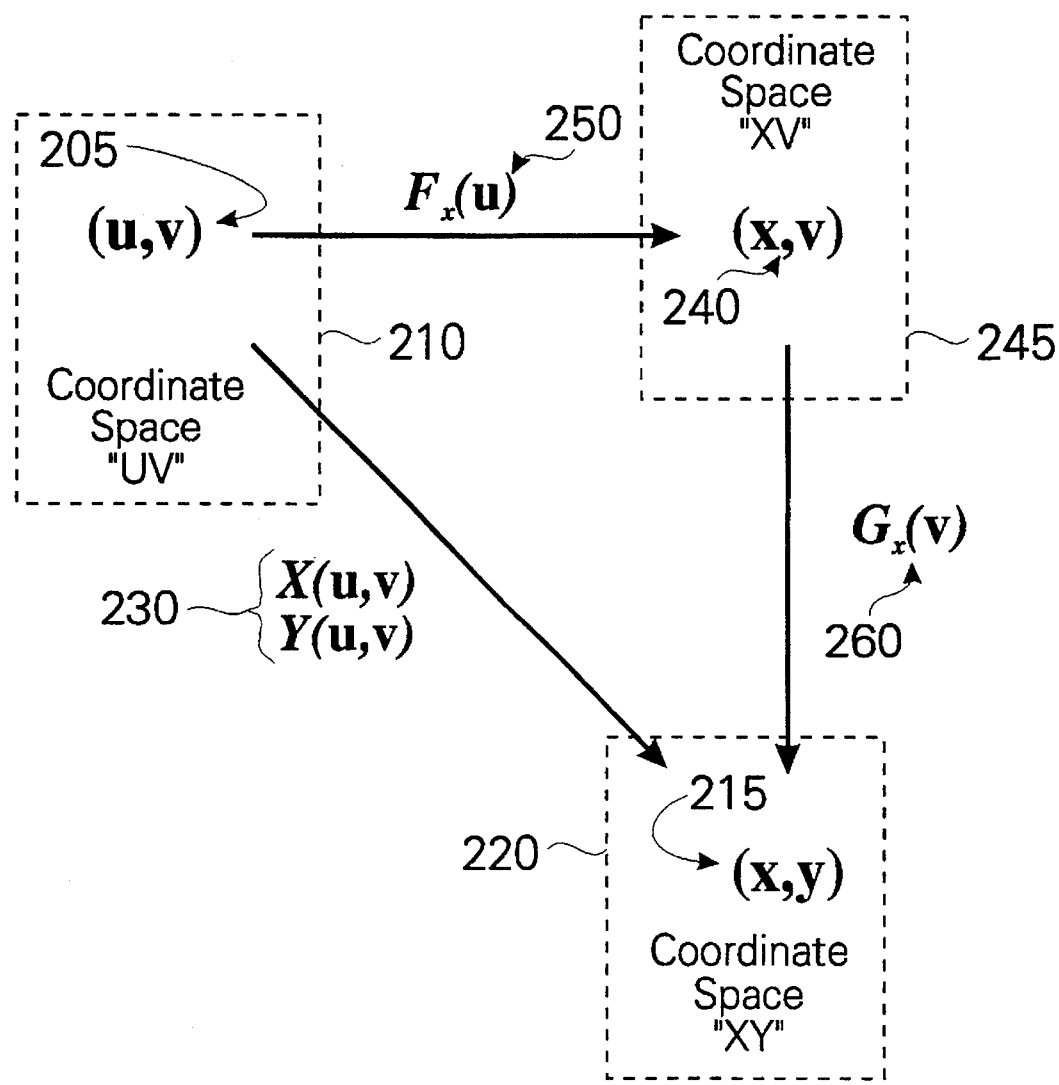
FIG. 2 is a diagram contrasting a transformation in two dimensions simultaneously with a pair of cascaded one dimensional transformations in the prior art.
Figure 3A:
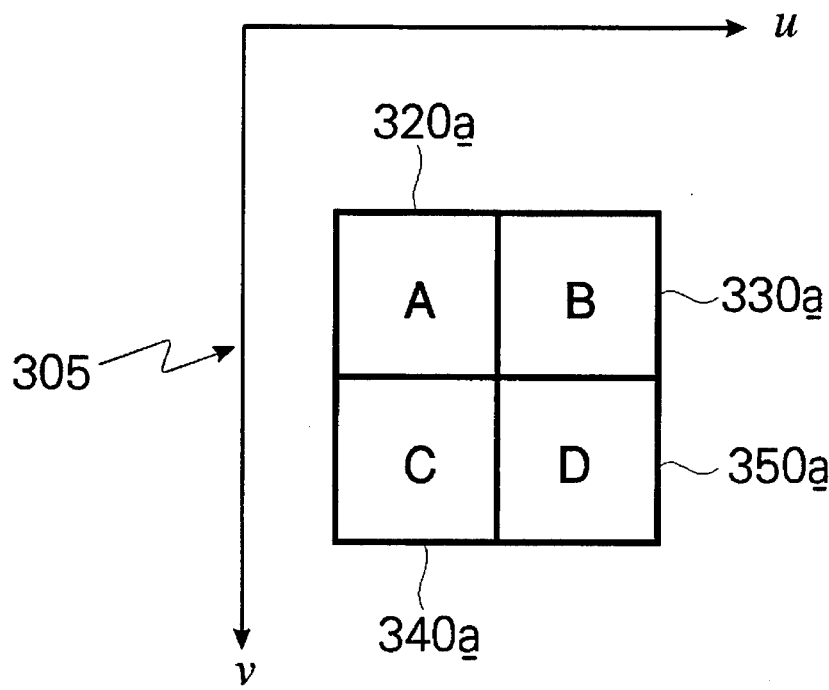
FIG. 3a is a representation of four adjacent input pixels in an input image space.

Referring to FIG. 3a, an arbitrary transformation of the form given in equation (8) comprising components of translation, scaling, shearing, and rotation, is to be applied to an input image comprising four pixels, "A" (320a), "B" (330a), "C" (340a), and "D" (350a) in an input image space coordinate system "uv" 305 wherein "u" coordinates represent horizontal position, and "v" coordinates represent vertical position.

Figure 3B:
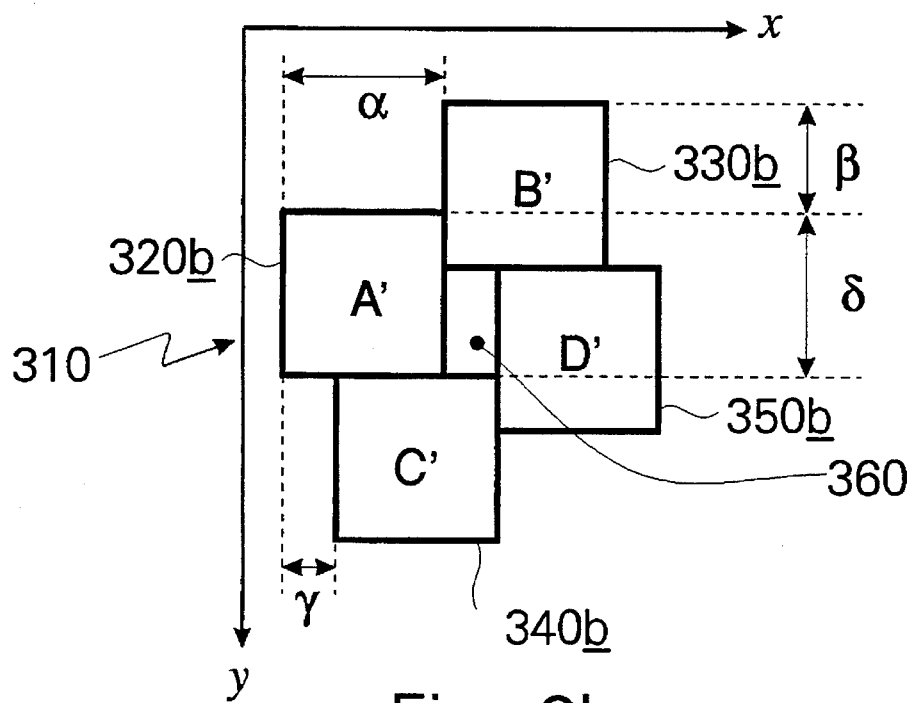
FIG. 3b is a representation of four output pixels in an output image space which correspond to the four input pixels of FIG. 3a, FIG. 4a is an illustration of an input image array having two rows of four pixels each.

Referring to FIG. 3b, where one such transformation has been applied, there is a resulting set of intermediate output metapixels "A'" (320b), "B'" (330b), "C'" (340b), and "D'" (350b) in output image coordinate system "xy" 310 which correspond to input pixels "A" (320a), "B" (330a), "C" (340a), and "D" (350a), respectively. These intermediate output metapixels represent idealized post-transformation output pixel locations and sizes, are not necessarily aligned to output pixels in output image space, and may be larger or smaller in either dimension than output pixels.

Hereinafter, transformation matrix coefficients will be referred to by their Greek letter designations (i.e., "α", "β", "γ", "δ", "ε", and "ζ") as given in equation (8).

After transformation (FIG. 3b), intermediate output metapixel "B'" (330b) is offset in output image space the "x" direction by an amount "α" and in the "y" direction by an amount "β" relative to intermediate output pixel "A'" (320b), these offset amounts "α" and "β" being equal to the α and β transformation matrix coefficients, respectively.

For any first input pixel having a corresponding first intermediate output metapixel (e.g. "A" (320a) and "A'" (320b), respectively) having an adjacent second input pixel in the horizontal direction with a corresponding second intermediate output pixel (e.g., "B" (330a) and "B'" (330b), respectively), the second intermediate output metapixel will be offset in output image space relative to the first intermediate output metapixel by an amount "α" equal to the α transformation matrix coefficient in the horizontal ("x") direction and by an amount "β" equal to the β transformation matrix coefficient in the vertical ("y") direction. Thus, in like manner, intermediate output metapixel "D'" (350b) is offset in output image space from intermediate output metapixel "C'" (340b) by a same amount "α" in the horizontal and a same amount "β" in the vertical.

Similarly, after transformation, intermediate output metapixel "C'" (340b) is offset in output image space the "x" direction by an amount "γ" and in the "y" direction by an amount "δ" relative to intermediate output pixel "A'" (320b), these offset amounts "γ" and "δ" being equal to the γ and δ transformation matrix coefficients, respectively.

For any first input pixel having a corresponding first intermediate output metapixel (e.g. "A" (320a) and "A'" (320b), respectively) having an adjacent second input pixel in the horizontal direction with a corresponding second intermediate output pixel (e.g., "C" (340a) and "C'" (340b), respectively), the second intermediate output metapixel will be offset in output image space relative to the first intermediate output metapixel by an amount "γ" equal to the γ transformation matrix coefficient in the horizontal ("x") direction and by an amount "δ" equal to the δ transformation matrix coefficient in the vertical ("y") direction. Thus, in like manner, intermediate output metapixel "D'" (350b) is offset in output image space from intermediate output metapixel "B'" (330b) by a same amount "γ" in the horizontal and a same amount "δ" in the vertical.

In keeping with this representation, intermediate output metapixels are defined as having height (in the vertical or "y" dimension of output image space) equal to "δ", and width (in the horizontal or "x" dimension of output image space) equal to "α".

Because of the fixed offset relationship between adjacent intermediate output metapixels, it is possible to calculate their coordinates without multiplication simply by processing input pixels in a sequential order where each subsequent pixel is adjacent to a previously processed pixel. In the case of a scanline order of processing (raster-scan style), it is possible to save the coordinates of a first pixel processed in any given row so that the coordinates of a first pixel in a subsequent row may be determined relative to it (i.e., "row reset").

In the event that input pixels are processed in a serpentine scan order, whereby every subsequent input pixel is adjacent to the input pixel processed immediately before, it is possible to process all pixels in an incremental fashion.

This incremental offset relationship between intermediate output metapixels corresponding to adjacent input pixels is demonstrated mathematically as follows:

Again referring to FIG. 3a, we assume that input pixels A, B, C, and D (320a, 330a, 340a, and 350a, respectively) are of unit (1×1) size in input image space. If a transformation of the form of equation 8 is applied to these input pixels, resulting in intermediate ouput metapixels A', B', C', and D' (320b, 330b, 340b, and 350b, respectively, with respect to FIG. 3b and corresponding to 320a, 330a, 340a, and 350a, respectively, with respect to FIG. 3a), the following equations apply:

$$x_{A'} = \alpha \times u_A + \gamma \times v_A + \epsilon$$

$$y_{A'} = \beta \times u_A + \delta \times v_A + \zeta \qquad (12)$$

$$x_{B'} = \alpha \times u_B + \gamma \times v_B + \epsilon$$

$$y_{B'} = \beta \times u_B + \delta \times v_B + \zeta \qquad (13)$$

where $u_A$ and $v_A$ are the u and v coordinates of A in input image space and $x_{A'}$ and $y_{A'}$ are the x and y coordinates of A' in output image space.

It should be observed, however, that the following relationship between input pixels A and B exists:

$$u_B = u_A + 1$$

$$v_B = v_A \qquad (14)$$

Applying (14) to (13) we get:

$$x_{B'} = \alpha \times (u_A + 1) + \gamma \times v_A + \epsilon$$

$$y_{B'} = \beta \times (u_A + 1) + \delta \times v_A + \zeta \qquad (15)$$

Simplifying according to (12), then, this reduces to:

$$x_{B'} = x_{A'} + \alpha$$

$$y_{B'} = y_{A'} + \beta \qquad (16)$$

Similarly, it can be shown that the following relationships are also true:

$$x_C = x_A + \gamma$$

$$y_C = y_A + \delta \quad (17)$$

$$x_D = x_C + \alpha$$

$$y_D = y_C + \beta \quad (18)$$

Again referring to FIG. 3b, a side effect of the transformation is a hole 360 in between intermediate output metapixels. This hole represents incomplete output pixel coverage in output image space which, if left as is, would result in skipping output pixels.

Figure 4A:
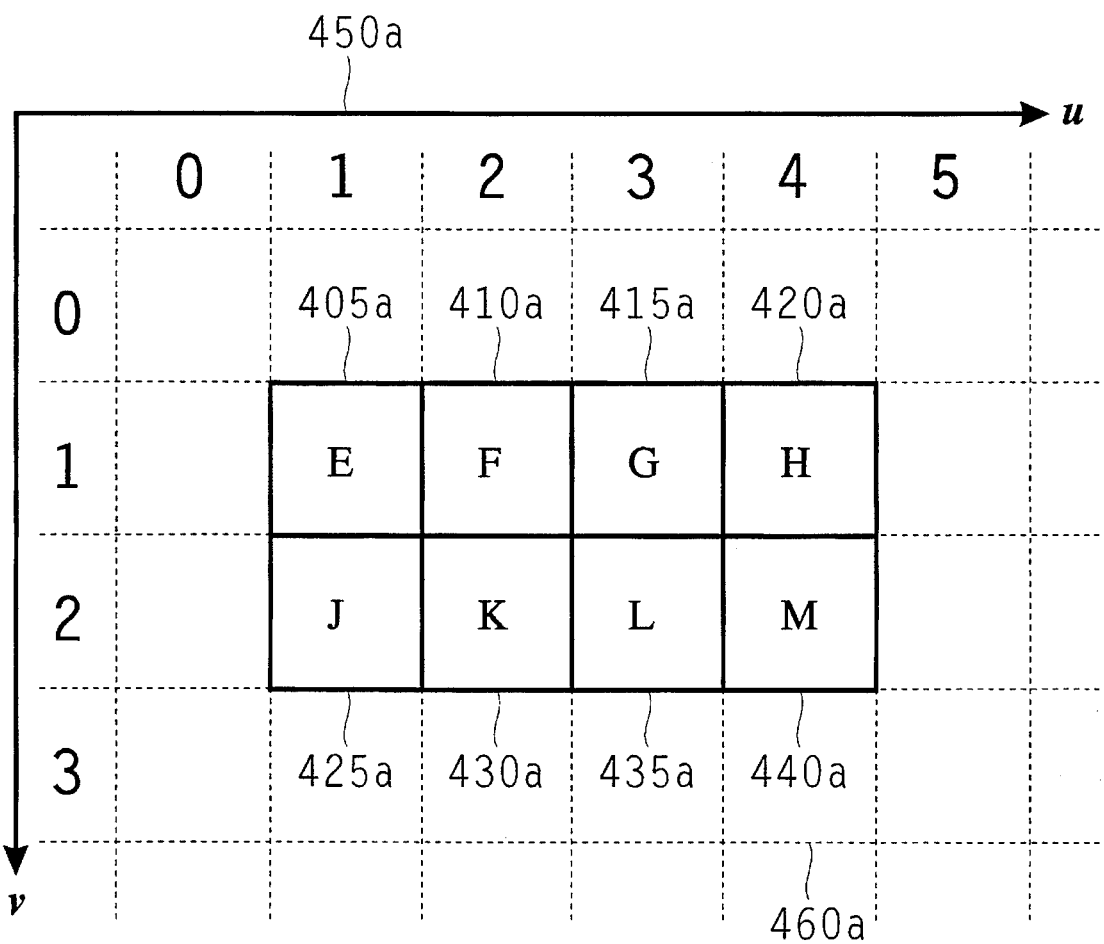
FIG. 4b is an illustration of an ideal output image array based upon a transformation of the input image array of FIG. 4a illustrating holes between the transformed pixels.
FIG. 4c illustrates the process of eliminating holes as it relates to the present invention.
FIG. 4d illustrates the process of splitting metapixels as it relates to the present invention.
FIG. 4e illustrates the output pixel array resulting from the method of the present invention when applied to FIG. 4d.

FIG. 4a shows a slightly more complicated grouping of eight input pixels E, F, G, H, J, K, L, and M (405a, 410a, 415a, 420a, 425a, 430a, 435a, and 440a, respectively) in an input image space 460a. A "uv" input coordinate system 450a applies to this input image space. The "u" and "v" axes are labelled in input pixel units, 0 to 5 on the "u" or horizontal axis, and 0 to 3 on the "v" or vertical axis.

Figure 4B:
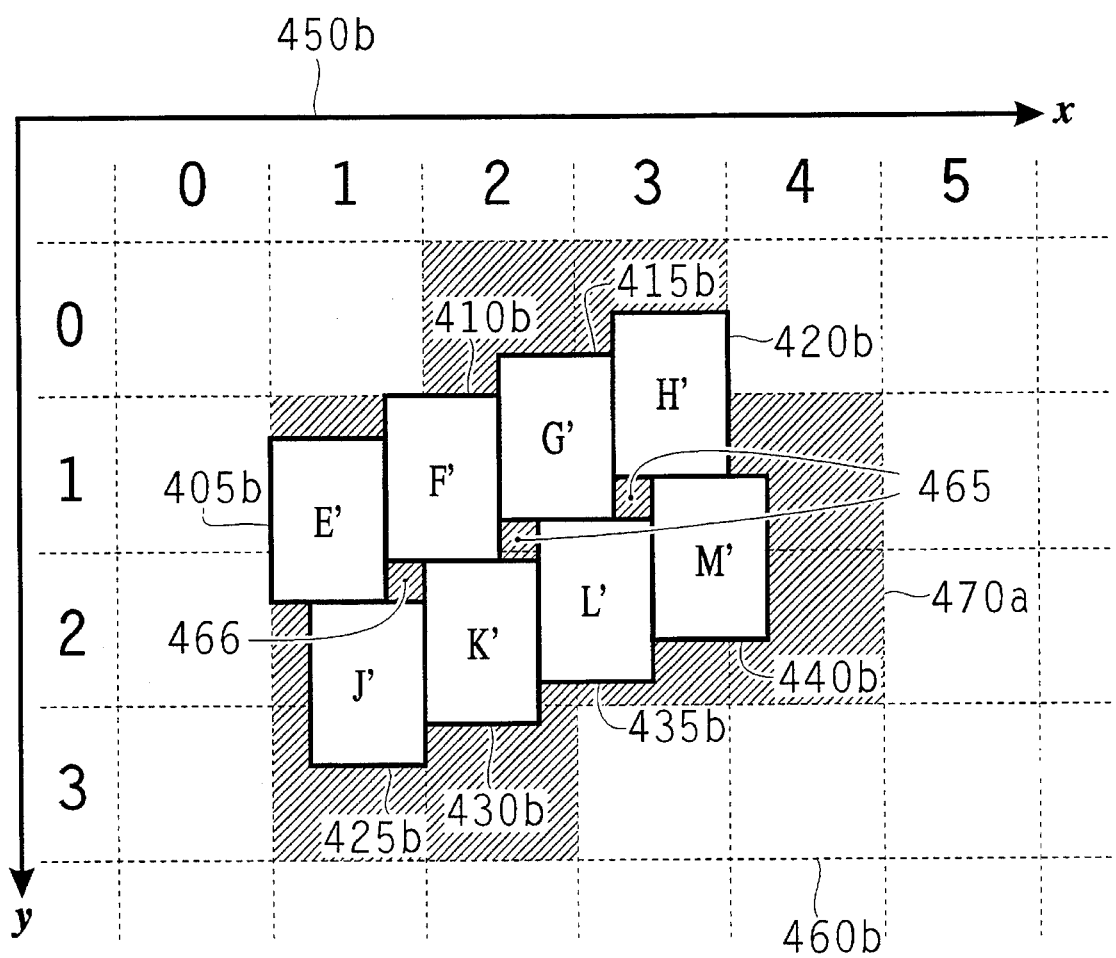

A transformation of the form of (8) is applied to the eight input pixels, resulting in the situation shown in FIG. 4b, with eight intermediate output metapixels E', F', G', H', J', K', L', and M' (405b, 410b, 415b, 420b, 425b, 430b, 435b, and 440b, respectively) corresponding to input pixels E, F, G, H, J, K, L, and M (405a, 410a, 415a, 420a, 425a, 430a, 435a, and 440a, respectively), in an output image space 460b, having an "xy" output coordinate system 450b. As a result of the transformation, FIG. 4b shows hole 466 and holes 465 in between the intermediate output metapixels. It should be noted that any holes so created will have the same size and shape, and will be located in the same position relative to each intermediate output metapixel. The height of any such hole is equal to the magnitude of the β transformation coefficient, and its width is equal to the magnitude of the γ transformation matrix coefficient. Shaded area 470a in FIG. 4b shows all output pixels which are at least partially covered by intermediate output pixels E', F', G', H', J', K', L', and M' (405b, 410b, 415b, 420b, 425b, 430b, 435b, and 440b, respectively).

Figure 4C:
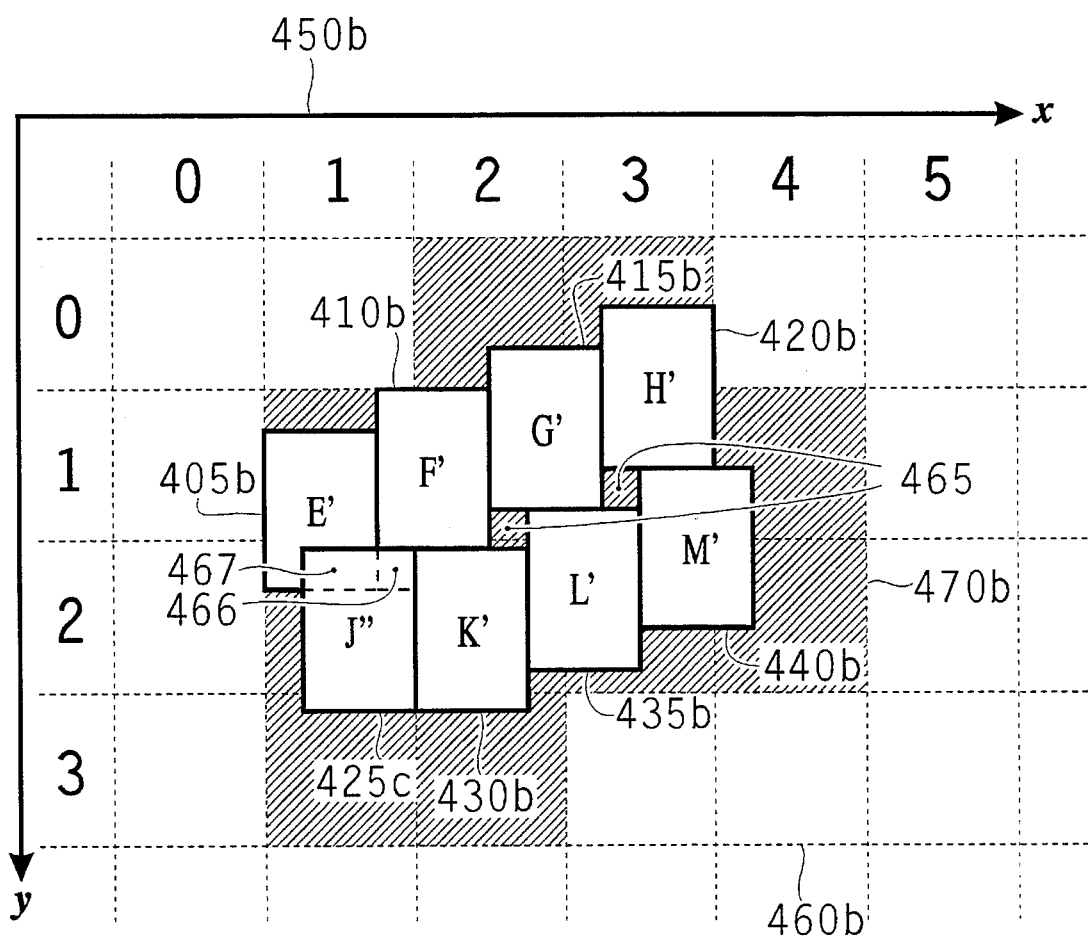

FIG. 4c shows a first step in an attempt to eliminate these holes. Intermediate output metapixel J' (425b with respect to FIG. 4b) is moved upward an amount equal to the height of hole 466, creating a new intermediate output metapixel J" (425c with respect to FIG. 4c) completely covering the hole 466, but creating an overlap area 467. Shaded area 470b shows all output pixels which are at least partially covered by intermediate output metapixels in FIG. 4c.

Figure 4D:
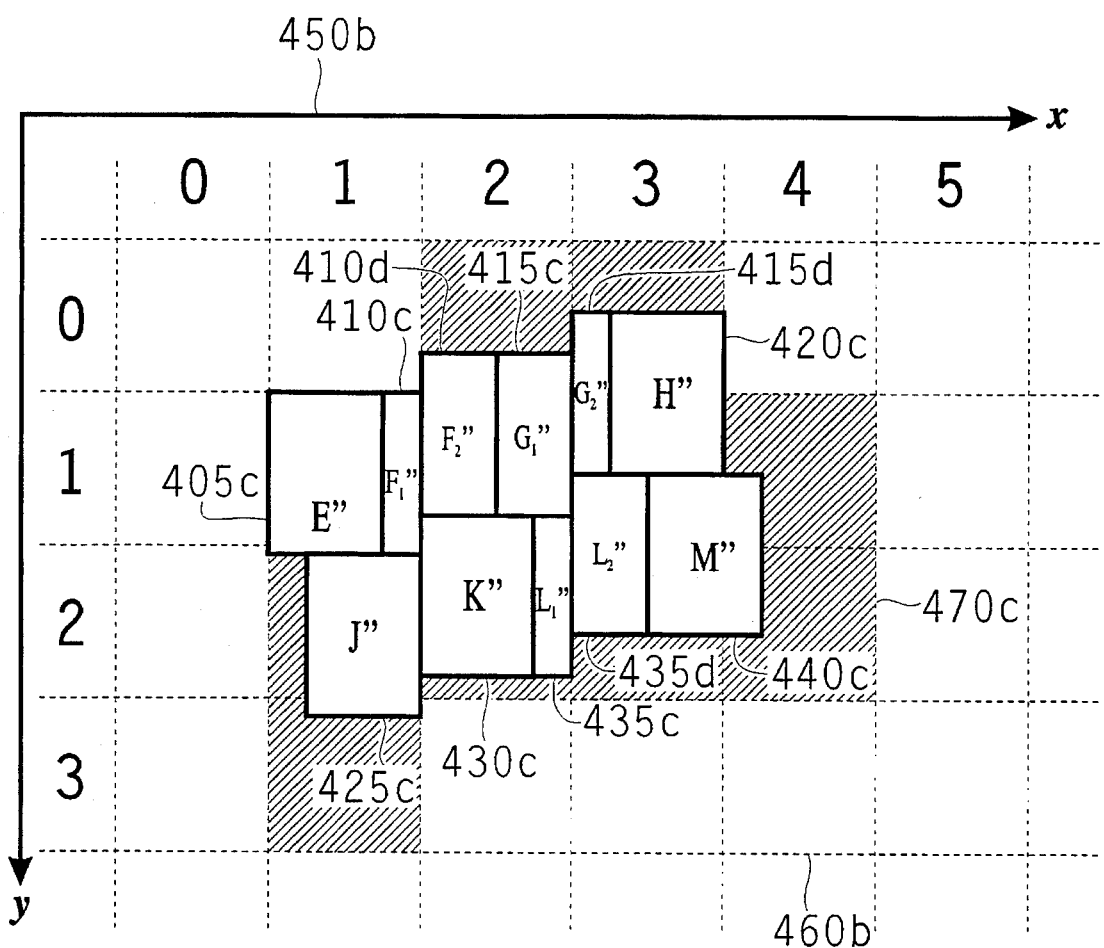

FIG. 4d shows the result of completing the elimination of holes. All remaining intermediate output metapixels are moved upward by the same amount as intermediate metapixel J' (425b), but intermediate output metapixels which straddle output pixel boundaries, in this case F', G', K', and L' (410b, 415b, 430b, and 435b with respect to FIGS. 4b and 4c), are first split into two sub-metapixels each, the left-most of which is not shifted vertically. That is, intermediate output metapixel F' (410b) is split into two sub-metapixels $F_1''$ (410c with respect to FIG. 4d) and $F_2''$ (410d with respect to FIG. 4d), with only $F_2''$ (410d) being shifted vertically.

Similarly, G' (415b) is split into two sub-metapixels $G_1''$ (415c) and $G_2''$ (415d), where only $G_2''$ (415d) is shifted vertically; K' (430b) is split into two sub-metapixels $K_1''$ (430c) and $K_2''$ (430d), where only $K_2''$ (415d) is shifted vertically; and L' (435b) is split into two sub-metapixels $L_1''$ (435c) and $L_2''$ (435d), where only $L_2''$ (435d) is shifted vertically. Shaded area 470c shows all output pixels which are at least partially covered by intermediate output metapixels and sub-metapixels in FIG. 4d, and for which intensity values must be calculated.

Figure 4E:
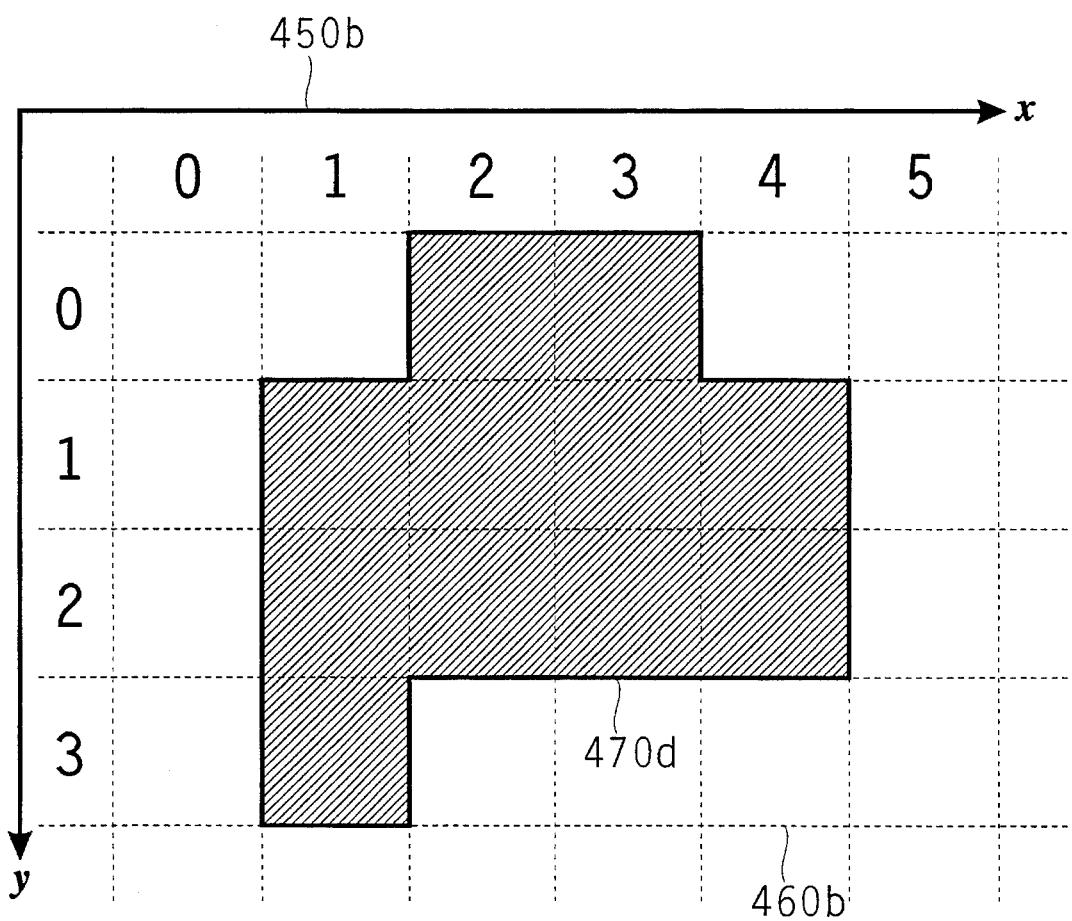

After this vertical shifting is complete, the intermediate output metapixels and sub-metapixels form a completed intermediate image map which must be applied to output image space. Each intermediate output metapixel and sub-metapixel covers an area in output image space 460b. FIG. 4e shows a shaded area, 470d (identical to 470c in FIG. 4d, but partially obscured in FIG. 4d), which covers all output pixels in output space 460b in the output coordinate system 450b which are at least partially covered by intermediate output metapixels and sub-metapixels in FIG. 4d.

It should be noted that the shaded areas 470c with respect to FIG. 4d and 470d with respect to FIG. 4e are not the same as shaded areas 470a with respect to FIG. 4b and 470b with respect to FIG. 4c. This is because as the process of vertically shifting intermediate output metapixels proceeds, coverage of output pixels is altered slightly. This "skipping" of pixels can occur only at image edges and does not deteriorate output image quality extensively.

In the foregoing discussion, the rotation was depicted as a counter-clockwise rotation, which created holes between intermediate output metapixels. In the case of a clockwise rotation, however, overlaps would be created, instead of holes. The process of overlap elimination is identical to that for the elimination of holes. Intermediate output metapixels are moved vertically such that they eliminate the overlap (and create holes). The process of intermediate output metapixel splitting into sub-etapixels and selective shifting of these sub-metapixels eliminates holes and overlaps in the same way. The only significant difference is the direction of the the intermediate output metapixel vertical shift which occurs to eliminate the overlaps.

The foregoing discussion illustrates the computation of intermediate output metapixel coordinates in an incremental fashion, and shows how holes and overlaps may be eliminated. But, at this point, intensity values have not yet been computed for output pixels. The method of the present invention calculates output pixel coordinates and output pixel intensity values in an interleaved fashion. In order to simplify the description of this incremental computation, the following definitions are made, where it is assumed that all screen coordinates are in the second quadrant:

IS: is a set of input pixels that are in a single row in input image space according to the selected order of processing.

h-pass$_m$ equations:

$$x_{A'} = \alpha \times u_A \gamma \times v_A + \epsilon$$

$$y_{A'} = \beta \times u_A \gamma \times u_A + \zeta \quad (19)$$

$$x_{B'} = x_{A'} + \alpha \quad (20)$$

$$x_{C'} = x_{A'} + \gamma \quad (21)$$

where subscripts A', B', and C' refer to relative positions of intermediate output metapixels whose corresponding adjacent input pixels are located relative to one another in the manner shown in FIG. 3, such that an arbitrarily selected reference input pixel A has an input pixel B immediately to the right of it and an input pixel C immediately below it.

h-pass$_m$: consists of applying h-pass$_m$ equations 19, 20, and 21 to the set IS, inrows, according to a selected order of processing. Equation (19) is applied to calculate the location of an intermediate output pixel corresponding to a first input pixel in IS in order to establish a reference point. Equation (20) is applied to each subsequent input pixel in IS which is processed in a left-right direction and equation (21) is applied to each subsequent input pixel in IS which is processed in a top-bottom direction. If the direction of processing is right-to-left, then the sign is reversed in equation (20). Likewise, if the direction of processing is bottom to top, then the sign is reversed in equation (21). h-pass$_m$ results in the generations of one or more HPP's and/or an IHPP, defined below.

HPP: is a horizontal partial pixel that is of unit width. The floor of its x coordinate derived from applying h-pass$_m$ equations to the leftmost input pixel in IS forming this HPP gives the left-edge screen coordinate of the HPP. The ceiling of the x coordinate derived from applying h-pass$_m$ equations to the rightmost input pixel in IS forming this HPP gives the right-edge screen coordinate of the HPP. The "ceiling" of a value is the next larger integer value. The "floor" of a value is the nearest integer value which is less than or equal to that value.

IHPP: is an incomplete HPP. It contains a transformed input pixel of IS (intermediate output metapixel) which will not occupy a complete HPP. It is generated by h-pass$_m$ when an intermediate output metapixel which completes one HPP spills over into the next HPP, but does not complete it. An IHPP contains a scaled intensity value which corresponds to the portion of the intermediate output metapixel which spills over into the next HPP. An IHPP used during a subsequent h-pass$_m$ in conjunction with a next input pixel in IS to generate a next HPP. At the end of a row of input pixel processing, a remaining non-zero IHPP value will be copied directly to an HPP.

v-pass$_m$ equations:

$$y_B = y_A + \beta \quad (22)$$

$$y_C = y_A + \delta \quad (23)$$

where reference subscripts have the same meaning as for h-pass$_m$.

v-pass$_m$: consists of applying equations (22) and (23) on one or more HPP's, according to the selected order of processing of input pixels in IS. Equation (22) is applied to HPP's corresponding to subsequent input pixels in IS processed in a left-right direction. The sign of the addition in (22) is reversed for right-left processing. Equation (23) is applied to HPP's corresponding to subsequent input pixels in IS processed in a top-bottom direction. The sign of the addition in (23) is reversed for bottom-top processing. It produces a set of OS's and/or IOS's, defined below.

OS: is a completed output pixel. The x output image coordinates of an OS are the same as those of the HPP which is used to produce it in a v-pass$_m$. The top edge output image coordinate of an OS is the floor of the y-coordinate of the top-most HPP used in a v-pass$_m$ to produce it. The bottom edge output image coordinate of an OS is the floor of the y coordinate of the same HPP.

IOS: is the set of incomplete output pixels, that is, those output pixels containing an HPP that does not provide complete vertical coverage of an output pixel. The set of IOS's is equal in number to the number of input pixels in a row in IS according to the selected direction of processing. Unlike IHPP, of which there is only one, there are as many IOS's as there are output pixels in a single row. An IOS is used in a next v-pass$_m$ in conjunction with one or more HPP's to generate an OS. At the end of processing of input pixels, remaining IOS's are converted directly to OS's.

A complete description of the method of the present invention follows:

For a given transformation of the form of equation (8):

1) For every row of input pixels IS according to the selected direction of processing:

2) Compute a rotation factor (an integral multiple of 90 degrees) which, applied to the transformation matrix, reduces the effective rotation component of the transformation to fall within the range of +45 degrees to −45 degrees, then recompute the transformation matrix parameters to include this "angle reduction".

3) Perform h-pass$_m$ on a sufficient number of pixels to produce an HPP. This includes the following:
   3a) calculate coordinates of intermediate output metapixels, including $\alpha$ and $\gamma$ shifts, as required.
   3b) Calculate intensity of HPP from the intensities of the input pixels in IS used to produce HPP and IHPP, by scaling proportionally according to the amount of HPP area which is covered by each.
   3c) Generate an IHPP, if necessary. If at the end of a row of input pixels, convert any non-zero IHPP value to a new HPP.

4) Perform v-pass$_m$ on a sufficient number of HPP's to produce an OS. This includes the following:
   4a) compute coordinates, including $\beta$ and $\delta$ shifts, as required.
   4b) apply the rotation factor computed in step 2 to these coordinates, providing the full required rotation.
   4c) compute intensities using the contributing HPP's and the corresponding element of IOS, if necessary from the previous v-pass$_m$.
   4c) generate an IOS, as required.

5) After all rows of input pixels have been processed, perform a final v-pass$_m$ on the IOS's using zero values for HPP values and create a final row of OS's.

Figure 5:
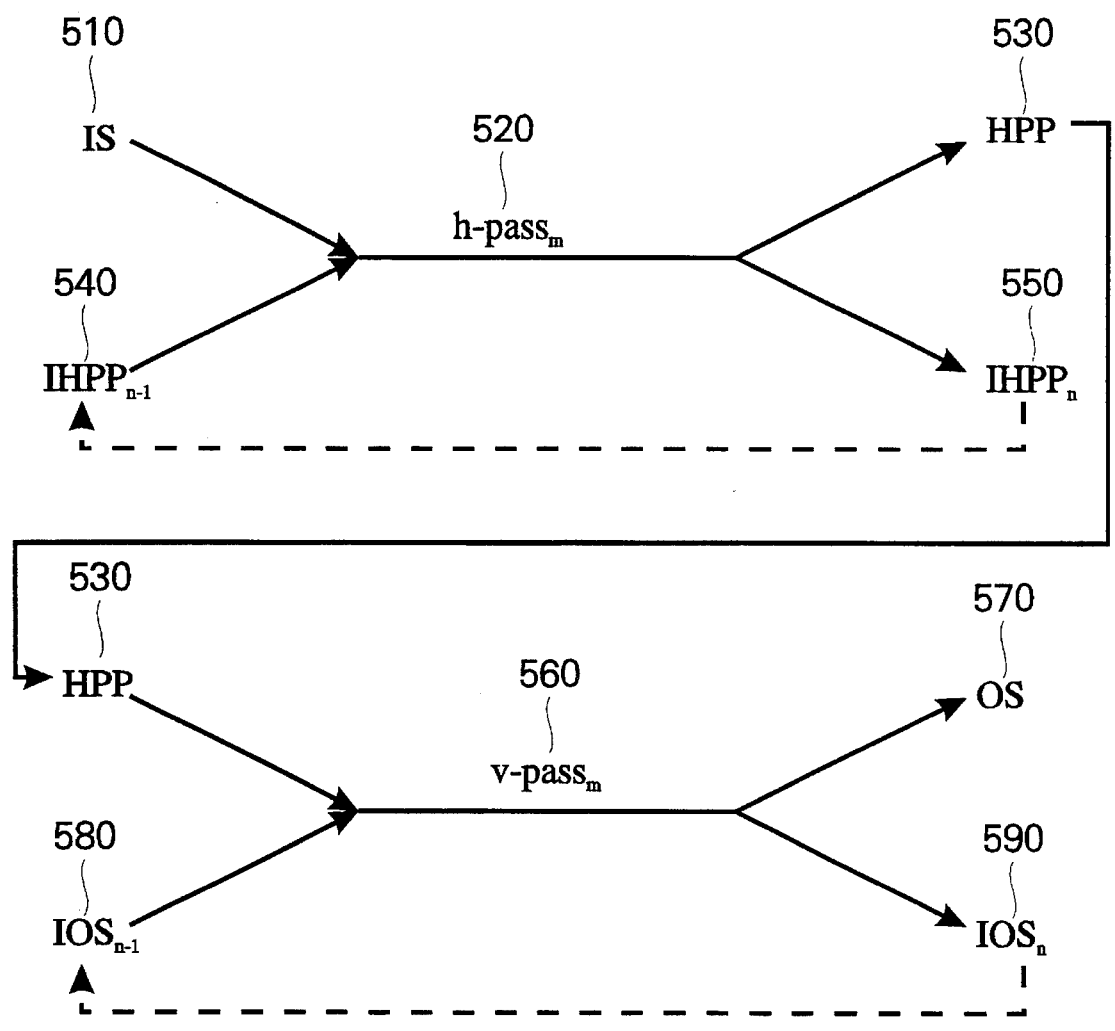
FIG. 5 is a diagram of data flow according to the method of the present invention.

After the first h-pass$_m$ (step 3), subsequent h-pass$_m$'s can be performed in parallel with v-pass$_m$'s (step 3). FIG. 5 depicts the data flow of the method of the present invention. A process h-pass$_m$ 520 operates on inputs IS (510) and IHPP$_{n-1}$ (540) and produces outputs HPP (530) and IHPP$_n$ (550). IHPP$_n$ (550) is the IHPP resulting from the "$n^{th}$" execution of h-pass$_m$ on an IS. IHPP$_{n-1}$ (540) is the IHPP resulting from the previous execution of h-pass$_m$ on an IS. HPP's so produced (530) are then operated upon by a process v-pass$_m$ (560) which produces OS (570) and IOS$_m$ (590). The process vpass$_m$ also accepts input IOS$_{m-1}$ (580). IOS$_m$ (570) is the IOS produced by the execution of v-pass$_m$ on a set of HPP's produced by the execution of h-pass$_m$ on an IS. IOS$_{m-1}$ is the previously produced IOS.

From this, it can be seen that an "$n^{th}$" v-pass$_m$ is dependent only on the HPP produced by an "$n^{th}$" h-pass$_m$, and is completely independent of any of the results of an "$n+1^{th}$" h-pass$_m$. As a result it is possible, given appropriate computing equipment to execute these portions of the method of the invention in parallel and in a pipelined fashion.

Figure 6A:
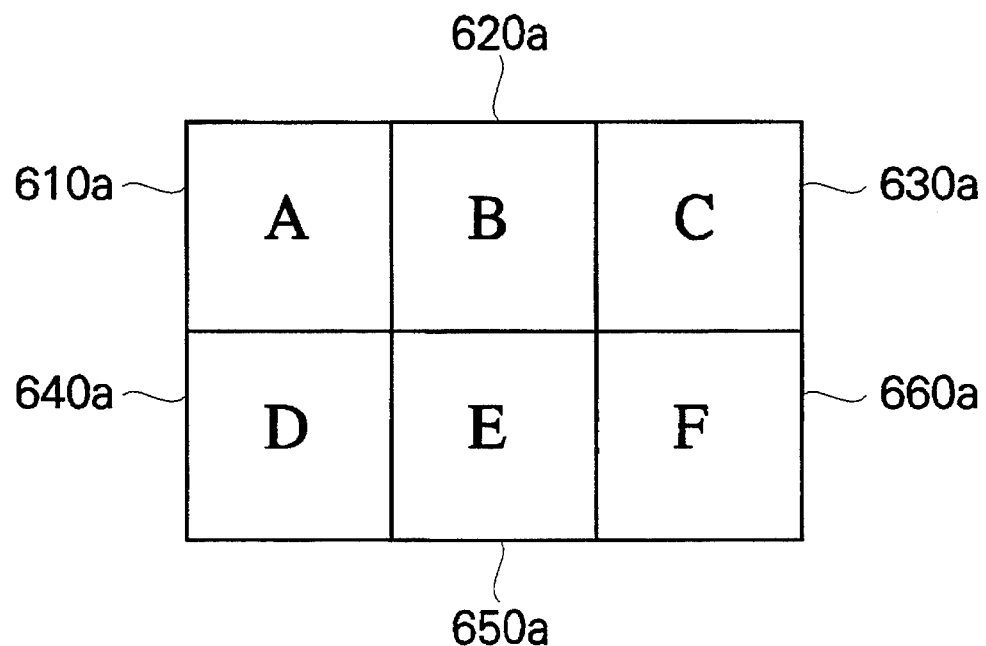
FIGS. 6a through 6e are diagrams showing the application of the method of the present invention to a specific example.

FIG. 6a shows an input image, made up of two rows of three input pixels each: a first row comprising pixels A, B, and C (610a, 620a, and 630a, respectively), and a second row comprising pixels D,E, and F (640a, 650a, and 660a, respectively). An arbitrarily selected transformation will shrink the image by an amount in the horizontal direction, zoom the image by the same amount in the vertical direction, and rotate the image in a counter-clockwise direction. After expressing the transformation in the form given by equation (8), it will be seen that:

$$0.0 < \alpha < 1.0$$
$$\beta < 0.0$$
$$\gamma > 0.0$$
$$\delta > 1.0 \qquad (24)$$

Figure 6B:
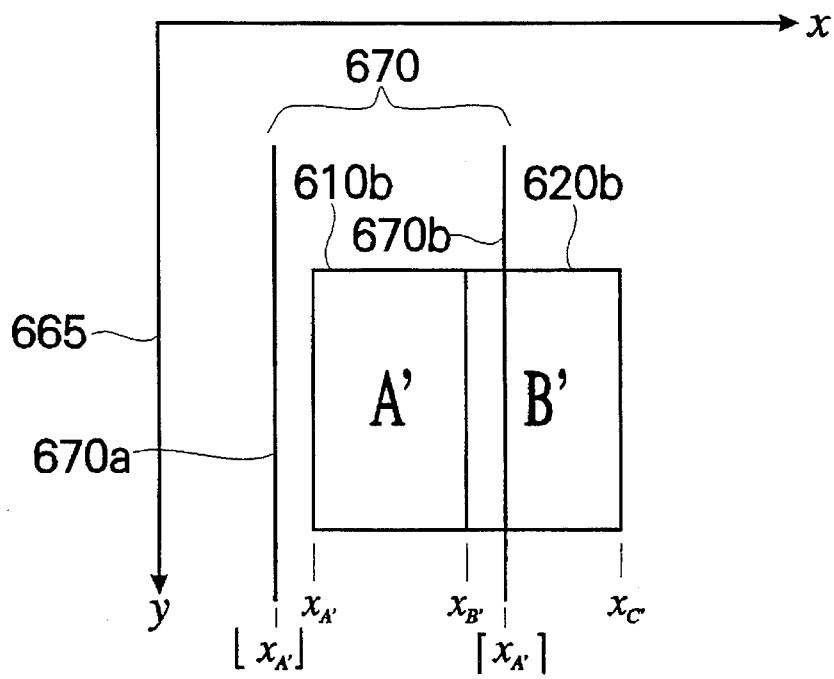

Referring to FIG. 6b, h-pass$_m$ is applied to first input pixel A to generate its intermediate output metapixel x coordinate $x_{A'}$ in output coordinate system 665, according to equation (19). Next it is necessary to find out if A' 610b will occupy the complete area of an HPP (HPP1 (670) in this case). This is done by determining if A' 610b is wide enough to cross the right edge of HPP1 670b, and if so, then A' occupies HPP1 670 completely. The width of A' 610b ($\alpha$) is also the offset from the left edge of A' 610b to the left edge of B' 620b, the transformation of B. This left edge of B' 620b is determined by adding $\alpha$ to $x_{A'}$. In order to determine whether A' 610b completely fills HPP1 670, we compare $x_{B'}$ to the ceiling of $x_{A'}$. If it is greater, then A' 610b completely fill HPP1 670. In this case, however, since there is a horizontal shrink ($\alpha < 1$), A' 610b does not fill HPP1 670 completely.

An intensity value is stored in HPP1$_i$, which is the intensity value for HPP1 according to:

$$HPP1_i = (\lceil x_{A'} \rceil - x_{B'}) \times A_i \qquad (25)$$

where $A_i$ is the intensity value for input pixel A.
The following notation conventions apply:

$\lceil x \rceil$ is read as "the ceiling of x"

$\lfloor x \rfloor$ is read as "the floor of x"

Therefore, HPP1$_i$ is the intensity ($A_i$) of input pixel A 610a scaled by its area coverage. Our next step is to see if intermediate output metapixel B' 620b in combination with A' 610b will completely cover HPP1 670. Applying the same technique, $x_C$ is determined by adding $\alpha$ to $x_{B'}$. Comparing $x_C$ to the ceiling of $x_{A'}$, we find that B' 620b does extend past the right edge of HPP1 670 into a next HPP.

Since B' 620b and A' 610b in combination do completely fill HPP1 670, HPP1$_i$ may now be updated as follows:

$$HPP1_i = HPP1_i + (\lceil x_{A'} \rceil - x_{B'}) \times B_i \qquad (27)$$

where $B_i$ is the intensity value of input pixel B. HPP1$_i$ now contains intensity value contributions from input pixels A and B scaled by their respective area contributions to HPP1 670. At this point, HPP1 670 is a completed HPP. However, a portion of B' 620b extends into a next HPP, thus creating an IHPP, which we will call IHPP1. The intensity value of IHPP1 is given by:

$$IHPP1_i = (x_C - \lceil x_{A'} \rceil) \times B_i \qquad (28)$$

which is the intensity of input pixel B scaled by the amount of B' 620b which extends into IHPP1.

Figure 6C:
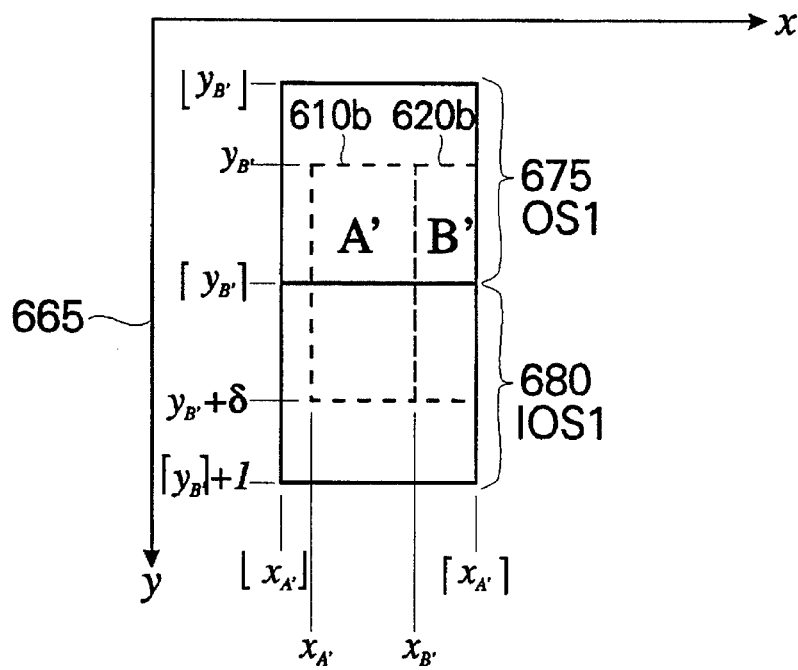

Next, we apply v-pass$_m$ to HPP1 670. This is shown in FIG. 6c. To find the y coordinate of HPP1, which according to the method of the invention is $y_{B'}$ (the y coordinate of the rightmost intermediate output metapixel contributing to HPP), we apply a $\beta$ shift as follows:

$$y_{B'} = y_{A'} + \beta \qquad (29)$$

The ceiling of $y_{B'}$ is the bottom edge of an OS (OS1 (675)) and the floor of $y_{B'}$ is the top edge of the same OS (assuming second quadrant screen coordinates where "down" corresponds to increasing y values). V-pass$_m$, using HPP1 670, will generate OS1 (675) if thr transformed height of HPP1 (which is also $y_{D'}$) is greater than the ceiling of $y_{B'}$. $y_{D'}$ is computed by applying a $\delta$ shift (adding the "$\delta$" transformation matrix coefficient to $y_{B'}$, the y coordinate of its vertically adjacent intermediate output metapixel). Assuming that $y_{D'}$ is greater than the ceiling of $y_{B'}$, we now have a completed OS1 (675) which can be applied to the output image as an output pixel. Horixontal and vertical output image coordinates for the top-left and bottom-right of this output pixel OS1 (670) are given by:

(left $x_{OS1}$, top $y_{OS1}$) = ($\lfloor x_{A'} \rfloor$, $\lfloor y_{B'} \rfloor$)

(right $x_{OS1}$, bottom $y_{OS1}$) = ($\lceil x_{A'} \rceil$, $\lceil y_{B'} \rceil$) \qquad (30)

The output intensity value for OS1 is given by:

$$OS1_i = HPP1_i$$

Applying equations (26) and (27) to (30):

$$OS1_i = (\lceil y_{B'} \rceil - y_{B'}) \times (x_B - x_{A'}) \times A_i + (\lceil y_{B'} \rceil - y_{B'}) \times (\lceil x_{A'} \rceil - x_{B'}) \times B_i \qquad (32)$$

which is exactly the intensity of a screen pixel created by input pixels A and B, but approximated to prevent holes and overlaps. An incomplete output pixel IOS1 (680) is also generated, the intensity of which is given by:

$$IOS1 = (y_{D'} - \lfloor y_{D'} \rfloor) \times HPP1 \qquad (33)$$

Figure 6D:
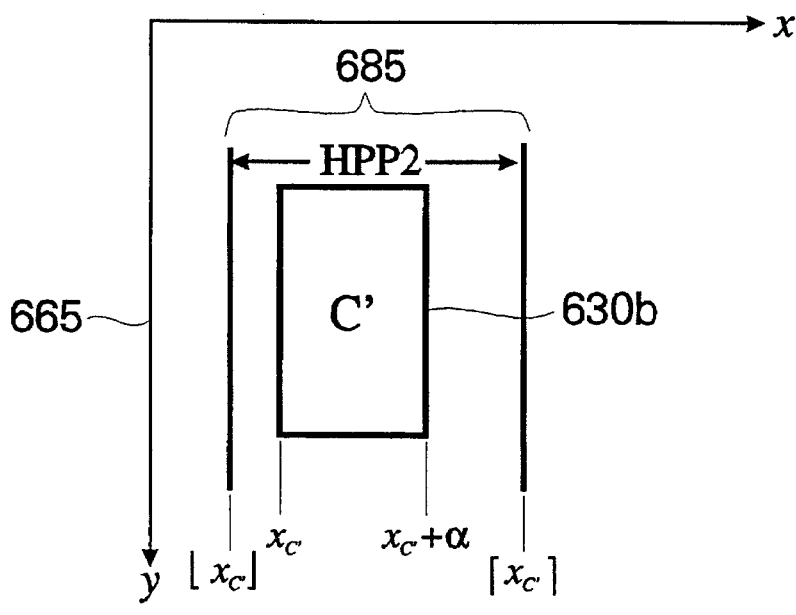

FIG. 6d shows the dimensional relationships between the next intermediate output metapixel, C' 630b and a next HPP, HPP2 685, in output image coordinate system 665.

During the generation of OS1 and IOS1, it is possible to work in parallel on a new HPP, HPP2 685. This is because the generation of HPP2 requires no results of calculations for the generation of OS1 675 and IOS1 680. HPP2 685 will be complete, since an end of a row of input pixels is reached there. The intensity of HPP2 is:

$$HPP2_i = IHPP1_i + |\alpha| \times C_i = (x_C - \lceil x_{B'} \rceil) \times B_i + |\alpha| \times C_i \qquad (34)$$

where $\alpha$ is the "$\alpha$" transformation matrix coefficient, and is equal in magnitude to the width of an intermediate output metapixel in output image space. This parameter is used because C' 630b is completely contained within the horizontal bounds of HPP2.

Performing a v-pass$_m$ on HPP2, we compute $y_C$ by applying a $\beta$-shift on $y_{B'}$ (adding transformation matrix coefficient "$\beta$" to $y_{B'}$), and generate an OS2, OS3, and IOS2. The screen coordinates and intensities of OS2 and OS3 can be determined in a manner like that uses to determine those for OS1. IOS2 will be made up of those parts of input pixels B and C which do not create a complete OS.

Beginning a new row of input pixels, according to the selected order of processing, we begin with input pixel D. $x_{D'}$ is computed by applying a $\gamma$-shift to $x_{A'}$. Intermediate output metapixels D' 640b and part of E' 650b combine to form an HPP, HPP3. An IHPP, IHPP3, is created from remaining portions of E' 650b which are not wide enough to complete an HPP. Performing a v-pass$_m$ on HPP3 and IOS1, generates an OS4, an OS5, and an IOS3. A parallel execution of h-pass$_m$ on IHPP3 and input pixel F generates an HPP4 (as the row of input pixels ends with input pixel F). Performing a v-pass$_m$ on HPP4 and IOS2 generates an OS6 and IOS4. Now that input scanning is complete, the IOS3 and IOS4 are written out as OS7 and OS8, respectively, since there will be no further HPP contributions.

Figure 6E:
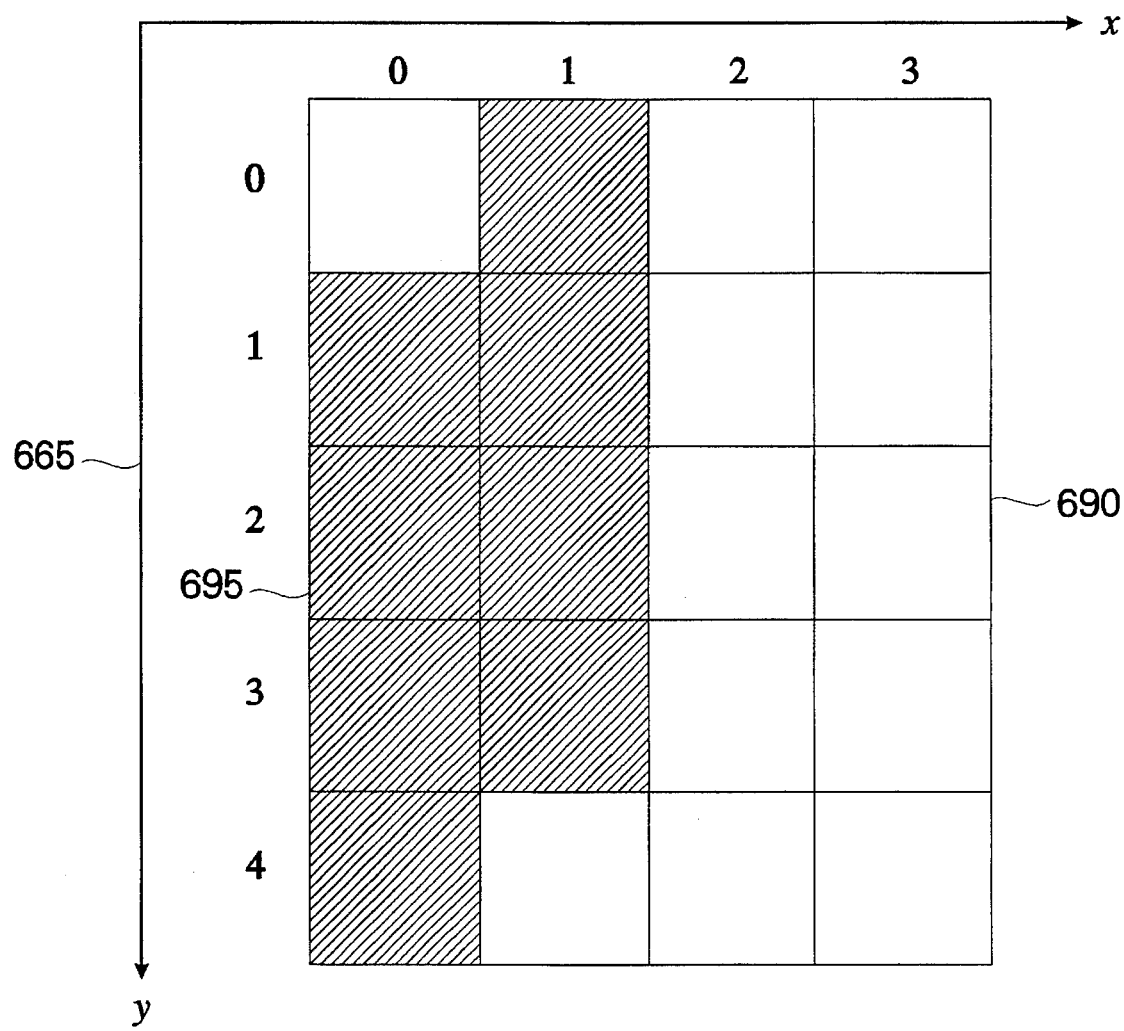

FIG. 6e shows a shaded area 695 in output image space 690 having output coordinate system 665. Shaded area 695 covers eight square regions in output image space 695 corresponding to the eight output pixels (OS1–OS8) generated by the method of the present invention when applied to the input pixels of FIG. 6a according to the arbitrarily selected image transformation.

Memory requirements for implementing this method in a computer or in dedicated hardware are: temporary intensity storage for one output pixel for h-pass$_m$ (IHPP), intensity for a complete row of output pixels for v-pass$_m$ (IOS), coordinate storage for a first intermediate output metapixel in a row, temporary storage for the coordinates of the last pixel processed, and storage for four transformation matrix coefficients (after the coordinate transformation for the first input pixel has been accomplished). Under ordinary circumstances, input image space and output image space, and their respective coordinate systems are identical.

In one embodiment, the selected order of processing is raster-scanline order. That is, the order of input pixel processing is determined by display hardware, which usually scans in a raster-scan format. Often, pixel data is readily accessible in this order. When input pixels are received from scanning hardware in a raster-scan "stream" of this type, no input image storage is required.

Figure 7:
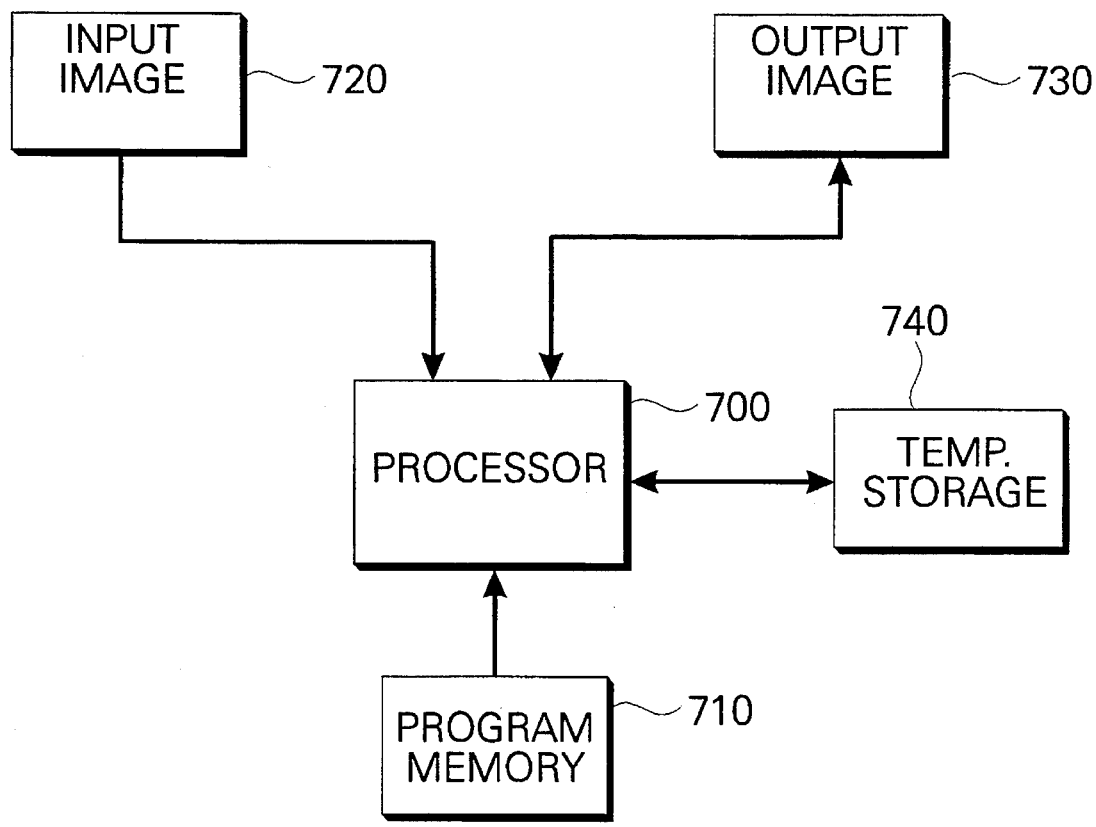
FIG. 7 illustrates a block diagram of an apparatus suitable for implementing the present invention.

FIG. 7 shows apparatus suitable for implementing the method of the invention. A processor 700 having program memory 710, in which is stored instructions corresponding to the steps of the method of the present invention, having an amount of memory set aside as temporary storage 740, has access to an input image 720 and an output image 730. The program controls the processor according to the method described hereinabove, accessing input pixels from input image 720 and storing output pixels into output image 730, and using temporary storage 740 to keep IHPP's, IOS's, reference coordinates, matrix coefficients, etc.

In the preferred embodiment, operations which can be performed in parallel are performed in parallel. That is, while v-pass$_m$ and intensity calculations are in progress, new h-pass$_m$ calculation may proceed in parallel. These operations may alternatively be performed in serial (one after the other), without loss of generality.

Appended hereto, and forming a part of the disclosure hereof, are the following:

1) a document entitled "SOFTWARE IMPLEMENTATION OF INTERLEAVED ALGORITHM". This document is a list of code (software) for operating on a suitable workstation to implement the teachings of the present invention.

METHOD FOR TRANSFORMING 2-D IMAGES FROM AN INPUT IMAGE SPACE TO AN OUTPUT IMAGE SPACE

APPENDIX

Title: SOFTWARE IMPLEMENTATION OF INTERLEAVED ALGORITHM

Copr. 1992, LSI Logic Corp.

Jun 7 09:51 1991 xformPerform.c.doc+code Page 1

```
/***********************************************************************/
/* This is the file that performs the transformations. It creates the  */
/* transformation matrix, performs the transformation (which is; computation of */
/* the addresses and the pixel values), stores the pixel values into the colormap */
/* and then displays the transformed image on the screen.              */
/***********************************************************************/ include <stdio.h>
include <math.h>
#include "xform.h"

/*
 * NULLPR is defined for pixrect routines.
 * CMAPSZ defines the size of the colormap.
 * DONE and ERROR are flag definitions.
 */ define NULLPR (struct pixrect *) NULL
define CMAPSZ 256
#define DONE 1
#define ERROR -1

/*
 * Output file parameters and function. This output file can be used to debug the
 * program. Code that writes into the file has been commented out.
 */

FILE *fopen(), *fpout;

static char rcsid[] = "$Header: xformPerform.c,v 1.5 91/03/26 14:09:54 epsilon|karthik Exp $";

/***********************************************************************/
/* The main routine of the transformation module. It sets up the output file */
/* clears the display pixrect, calls the routine that performs the transformation, */
/* and then calls the routine that displays the transformed image.     */
/***********************************************************************/
void
xformPerform()
{

/* Set up the output file */
fpout = fopen ("OUT", "w");

/* Clear the display pixrect */
pr_rop(xform_pixrect_fin,0, 0, CANVAS_WID, CANVAS_HT, PIX_CLR, NULLPR, 0, 0);

/*
 * If the transformation is valid (i.e., ROTATE, SCALE, TRANSLATE, (or a combination)
 * or MATRIX, then call the transformation routine and then the display routine.
 * Otherwise, break.
 */
switch (whichXform) {
    case ROTATE:
    case SCALE:
```

Jun  7 09:51 1991   xformPerform.c.doctcode Page 2

```
        case TRANSLATE:
        case MATRIX:
            OnePass ();
            xformPutXformImage(VPASS);
            printf ("Done\n");
            break;
        default:
            printf ("Unknown Xformation!!!\n");
            break;
        }
    fclose (fpout);
}

GenXformMatrix ()
/***********************************************************************/
/* This routine generates the intermediate transformation matrix for a */
/* transformation and then produces the final transformation as a result of matrix */
/* multiplication.                                                     */
/* It also calls a routine to print the transformation matrix.         */
/***********************************************************************/
{
    double cos(), sin(), sinVal, cosVal, theta;
    double xformMatrixIn[3][3];

switch (whichXform) {
        case (ROTATE):
            /* Convert degrees to radians */
            /* Clockwise rotation about the origin */
            theta = (3.1415926 * xformAmtX) / 180.0;
            sinVal = sin (theta);
            cosVal = cos (theta);
            /* clockwise rotation */
            xformMatrixIn[0][0] =  cosVal;
            xformMatrixIn[0][1] = -sinVal;
            xformMatrixIn[1][0] =  sinVal;
            xformMatrixIn[1][1] =  cosVal;
            /* perspective factor .. put a 0, for now */
            xformMatrixIn[0][2] = (double) 0.0;
            /* perspective factor .. put a 0, for now */
            xformMatrixIn[1][2] = (double) 0.0;
            xformMatrixIn[2][0] = (double) 0.0;
            xformMatrixIn[2][1] = (double) 0.0;
            xformMatrixIn[2][2] = (double) 1.0;
            break;
        case (TRANSLATE):
            xformMatrixIn[0][0] = (double) 1.0;
            xformMatrixIn[0][1] = (double) 0.0;
            xformMatrixIn[0][2] = (double) 0.0;
            xformMatrixIn[1][0] = (double) 0.0;
            xformMatrixIn[1][1] = (double) 1.0;
            xformMatrixIn[1][2] = (double) 0.0;
            xformMatrixIn[2][0] = (double) xformAmtX;
            xformMatrixIn[2][1] = (double) xformAmtY;
            xformMatrixIn[2][2] = (double) 1.0;
            break;
        case (SCALE):
```

Jun 7 09:51 1991 xformPerform.c.doc+code Page 3

```
            xformMatrixIn[0][0] = (double) xformAmtX;
            xformMatrixIn[0][1] = (double) 0.0;
            xformMatrixIn[0][2] = (double) 0.0;
            xformMatrixIn[1][0] = (double) 0.0;
            xformMatrixIn[1][1] = (double) xformAmtY;
            xformMatrixIn[1][2] = (double) 0.0;
            xformMatrixIn[2][0] = (double) 0.0;
            xformMatrixIn[2][1] = (double) 0.0;
            xformMatrixIn[2][2] = (double) 1.0;
            break;
    } xformMatrixMult (3, 3, 3, &xformMatrixIn[0][0], &xformMatrix[0][0], &xformMatrix[0][0]);

/* Perform Post Multiplication.. not Pre Multiplication */
    xformMatrixMult (3, 3, 3, &xformMatrixIn[0][0], &xformMatrix[0][0], &xformMatrix[0][0]);
    printf ("Transformation Matrix Is:\n");
    PrintMatrix (3, 3, &xformMatrix[0][0]);
}

PrintMatrix (rows, cols, inMatrix)
/* Routine to print a matrix, called inMatrix of size rows x cols */
int rows, cols;
double *inMatrix;
{
int indx1, indx2;

for (indx1 = 0; indx1 < rows; indx1++)
{
    for (indx2 = 0; indx2 < cols; indx2++)
        printf ("%f ", xformMatrix[indx1][indx2]);
    printf ("\n");
}
} loadCmap(red, green, blue)
unsigned char red[], green[], blue[];
/*
 * This routine loads the colormap with the values in red, green and blue.
 * At first, it calls a routine that checks the colormap to see if the value already
 * exists in the colormap table. If so, it returns the index returned by that
 * routine. If not, it sets up a new entry in the colormap, and returns the index.
 * It is made sure that the index to the colormap does not exceed the maximum number
 * (256) allowed in Sun.
 */
{
int indx, outIndx;

/*
 * The catch in this routine is that if the number of colors exceeds 256, and if
 * a closest vlaue is not found, then the last entry of the colormap is overwriten
 * by new values.
 */

/*
 * The following call is made to get the value that is closest to the values in red,
```

Jun  7 09:51 1991   xformPerform.c.doc+code Page 4

```
 * green and blue.  The routine could return ERROR if it was not able to find this
 * value, in this case, a new entry in the colormap is created.
 * destRed, destGreen, and destBlue are the arrays that are used to load the colormap
 */ outIndx = GetClosestPixVal (red, green, blue, destRed, destGreen, destBlue);
if (outIndx == ERROR)
   {
   /*
    * Creation of the new entry.. could possibly overwrite the last entry of the
    * colormap table.
    */
   destRed[numDestVals] = red[0];
   destGreen[numDestVals] = green[0];
   destBlue[numDestVals] = blue[0];
   outIndx = numDestVals++;
   /* This limits numDestVals to 255 */
   numDestVals = (numDestVals >= CMAPSZ) ? CMAPSZ-1 : numDestVals;
   }

/* Return the index to the old or new entry of the colormap */
return (outIndx);
}

GetClosestPixVal (outR, outG, outB, R, G, B)
unsigned char outR[], outG[], outB[], R[], G[], B[];
/*
 * This routine checks R, G, and B for values that are closest (if not the same) to
 * outR, outG, and outB.  If a closest fit is not possible, it returns ERROR.  If
 * either the same value or a closest fit is found, then the index of that entry in
 * the R, G, B arrays is returned.
 */
   {
   int indx, outIndx, stop, stop1;
   double rDiff, gDiff, bDiff;
   double D, minD, pow(), sqrt(), fabs();

stop = FALSE;
   if (numDestVals <= CMAPSZ-1)
      {
      /* Search to find the same values */
      for (indx = 0; !stop && indx < numDestVals; indx++)
         if ((outR[0] == R[indx] && (outG[0] == G[indx] && (outB[0] == B[indx]))
            stop = TRUE;
      }
   else
      {
      /* Search to find the closest fit */
      stop = TRUE;
      for (indx = 0, stop1 = FALSE; !stop1 && indx < CMAPSZ; indx++)
         {
         rDiff = pow (fabs ((double) ((int) outR[0] - (int) R[indx])), 2.0);
         gDiff = pow (fabs ((double) ((int) outG[0] - (int) G[indx])), 2.0);
         bDiff = pow (fabs ((double) ((int) outB[0] - (int) B[indx])), 2.0);
         D = sqrt (rDiff + gDiff + bDiff);
```

```
Jun  7 09:51 1991  xformPerform.c.doc+code Page 5 if (indx == 0)
                {
                minD = D;
                outIndx = indx;
                }
            else
                if (D < minD)
                    {
                    minD = D;
                    outIndx = indx;
                    } if (minD == 0.0)
                stopl = TRUE;
            }
        indx = ++outIndx;
        }
    if (stop)
        return (--indx);
    else
        return (ERROR);
    } xformMatrixMult (rA, cA, rB, cB, matrixA, matrixB, matrixC)
/*
 * This is a generic routine that performs matrix multiplication.
 * matrixA (rA x cA ) * matrixB (rB x cB) = matrixC (rA x cB).
 */
int rA, cA, rB, cB;
double *matrixA, *matrixB, *matrixC;
{
int rC, cC, size;
int indx1, indx2, indx3, indx4;
double *matrixTmp, *loca;

/* Check the sizes */
if (cA != rB)
    return (ERROR);

rC = rA;
cC = cB;

size = rC * cC;
matrixTmp = (double *) malloc (sizeof (double) * size);
loca = matrixTmp;

for (indx1 = 0; indx1 < size; matrixTmp++, indx1++)
    *matrixTmp = 0.0;
matrixTmp = loca;

size = rA * cA;
for (indx1 = 0; indx1 < size; indx1 += cA)
    for (indx2 = 0; indx2 < cB; indx2++, matrixTmp++)
        for (indx3 = 0, indx4 = 0; indx3 < cA; indx3++, indx4 += cB)
            *matrixTmp += (*(matrixA + indx1 + indx3)) * (*(matrixB + indx2 + indx4));
```

Jun  7 09:51 1991    xformPerform.c.doc+code Page 7

```
    double outRed, outGreen, outBlue;
    unsigned char outRedVal[1], outGreenVal[1], outBlueVal[1];
    double top, bottom, bottomNext;
    int pixValIn, pixValOut;

/*
 * A black and white source has only two pixel values (0 and 255); therefore, to
 * start with, the number of destination values are 0 and 255.
 * This is to be set to 256 for greyscale and color images.. and is done so in the
 * file xformDraw.c
 */ numDestVals = 2;

/*
 * Calculation of the X and Y limits from the top-left co-ordinate and the height
 * and width of the image.
 */
    limitX = Xpos + clipW;
    limitY = Ypos + clipH;

/* Loading the coeff aray with the top left corner of the source image. */
    coeff[0][0] = (double) Xpos;
    coeff[0][1] = (double) Ypos;
    coeff[0][2] = (double) 1.0;

/*
 * Performing the matrix multiplication to get the (x', y') of the top left corner of
 * the source image.
 */
    xformMatrixMult (1, 3, 3, 3, &coeff[0][0], &xformMatrix[0][0], &xformCoeff[0][0]);

/* Initializations of some variables */
    y1Pr = xformCoeff[0][1];
    x1Pr = xformCoeff[0][0];
    y2eroPr = y1Pr;
    x2eroPr = x1Pr;

/*
 * Precalculating the transformed center of orthognallty
 * (orthXCoord, orthYCoord) is (P0x, P0y)
 * (xCenterPr, yCenterPr) is (P0x', P0y')
 */
    coeff[0][0] = (double) orthXCoord;
    coeff[0][1] = (double) orthYCoord;
    coeff[0][2] = (double) 1.0;
    xformMatrixMult (1, 3, 3, 3, &coeff[0][0], &xformMatrix[0][0], &xformCoeff[0][0]);
    xCenterPr = xformCoeff[0][0];
    yCenterPr = xformCoeff[0][1];

/*
 * Initialize the scan line buffer.
 * Initializations of the values are done in the routine vPass so that rotations can
 * be aliased properly.  The reason that this cannot be done at this time is that the
 * percentage of the background in each pixel at the top is not a constant for
 * rotation; unlike scaling or translation.
```

```
/* Now parse matrixTmp into matrixC */
for (indx1 = 0; indx1 < rC; indx1++)
    for (indx2 = 0; indx2 < cC; indx2++, matrixC++, loca++)
        *matrixC = *loca;

return (DONE);
}

OnePass()
/*
 * This routine performs the hPass and then calls another routine to perform the
 * vPass.
 * It reads the source pixels in scanline order.  The hPass is performed on one or
 * or a group of source pixels till one completely hPass'ed pixel is available.
 * This hPass'ed pixel is then sent into the vPass routine.
 */

/*******************************/
/* REFER TO HPASS ALGORITHM */
/*******************************/

/*
 * Description of variables:
 * indxX, indxY: (x, y) addresses of input pixels;
 * Xpos, Ypos, clipW, clipH, limitX, limitY: start, dimension, and ending points of
 *   the image in the X and Y directions.
 * xIPr: x' of the present pixel;
 * xIPlPr: predicted x' of the next pixel to the right of the present pixel.
 * xZeroPr: x' of the leftmost pixel of the present scanline (updated at the end of
 *   a scanline).
 * yZeroPr: y' of the leftmost pixel of the present scanline (updated at the end of
 *   a scanline).
 * outRed, outGreen, outBlue: Values of the hPass'ed pixel; this is the hPass buffer.
 * outRedVal, outGreenVal, outBlueVal: Character values of the above variables to
 *   be fed into the colormap.
 * bottom: X co-ordinate of the starting destination screen pixel due to the present
 *   source pixel (floor (xIPr)).
 * bottomNext: X co-ordinate of the ending destination screen pixel due to the
 *   present source pixel (floor (xIPlPr)).
 * top: X co-ordinate of the screen pixel to the right of a destination pixel
 *   (ceil (xIPr)).
 * numDestVals: number of destination pixel values; used as a counter when loading
 *   the colormap.
 * pixValIn: the pixel value (colormap index) of the source pixel.
 * pixValOut: the pixel value (colormap index) of a hPass'ed pixel.. can be used to
 *   view the hPass'ed picture.
 * coeff: an array containing the (x, y) co-ordinates of the top-left corner of the
 *   source image.
 * xformMatrix: the transformation matrix..
 * xformCoeff: array containing (x', y') co-ordinates of the top-left corner of the
 *   source image.
 */
int indxX, indxY, indx;
int limitX, limitY;
double xIPr, xIPlPr, yZeroPr, xZeroPr;
```

```
Jun  7 09:51 1991   xformPerform.c.doc+code Page 8

*/
for (indx = 0; indx < SCANLNSZ; indx++)
{
    lineBuffer[indx].noVisit = TRUE;
    lineBuffer[indx].yIPlPr = 0.0;
}

/* Start processing the image from top to bottom */
for (indxY = Ypos; indxY <= limitY; indxY++)
{
    /* Initialize the hPass pixel buffer */
    outRed = outGreen = outBlue = (xIPr - floor(xIPr)) * 255.0;
    outRedVal[0] = outGreenVal[0] = outBlueVal[0] = lrint (outRed);

/* Process each scanline from left to right */
    for (indxX = Xpos; indxX <= limitX; indxX++)
    {
        /* Get the pixel value of the current source pixel */
        pixValIn = pr_get (dest_pixrect, indxX, indxY);

/*
         * The following is to be used if filtering of the input image is to be
         * done.
         */
        pixValIn = Filter (dest_pixrect, pixValIn, indxX, indxY);

/*
         * Predict the x' of the source pixel to the right of the current pixel.
         * Give the "a-shift".
         */
        xIPlPr = xIPr + xformMatrix[0][0];

/* Calculate top and bottom */
        top = ceil (xIPr);
        bottom = floor (xIPr);

/*
         * Determining whether a hPass'ed pixel is available, determining its
         * co-ordinates, and its value.
         */
        if (top == bottom)
        {
            /* If top and bottom are same,
             * the left boundary of the transformed source pixel is flush with that
             * of the destination pixel.
             */
            if (xIPlPr < (top + 1.0))
            {
                /* completely enclosed ... no hPass'ed pixel is available yet */
                outRed   = (xIPlPr - xIPr) * destRed[pixValIn];
                outGreen = (xIPlPr - xIPr) * destGreen[pixValIn];
                outBlue  = (xIPlPr - xIPr) * destBlue[pixValIn];
            }
            else
            {
```

```
                 /*
                  * The other cases.. definite to have at least one hPass'ed pixel
                  * bottomNext gives the x co-ordinate of the last hPass'ed pixel to
                  * be output.
                  */
                 bottomNext = floor (xIPlPr);

outRed   = destRed[pixValIn];
                 outGreen = destGreen[pixValIn];
                 outBlue  = destBlue[pixValIn];

if (bottomNext > top)
                 {
                     /* The source pixel occupies more than one hPass'ed pixel */
                     outRedVal[0]   = lrint (outRed);
                     outGreenVal[0] = lrint (outGreen);
                     outBlueVal[0]  = lrint (outBlue);

for (; bottom < bottomNext; bottom++)
                     {
                         /* A complete hPass'ed pixel is available */
/* To be uncommented if hPass'ed image is to be viewed.
                         pixValOut = loadCmap (outRedVal, outGreenVal, outBlueVal);
                         pr_put (xform_pixrect_fin, (int) bottom, lndxY, pixValOut);
*/
                         /*
                          * Pass this pixel to the vPass routine;
                          * The information passed are: x', and the pixel values.
                          */
                         vPass ((int) bottom, outRedVal, outGreenVal, outBlueVal);

/*
                          * Predict the y' of the next hPass'ed pixel
                          * Give the multiple "b-shift"
                          */
                         /* REFER TO HPASS ALGORITHM */
                         yIPr = yZeroPr + ((1 + lndxX - Xpos) * xformMatrix[0][1]);
                     }
                 }

/* Place the "over-hang" portion if any into the hPass Buffer */
                 outRed   = (xIPlPr - bottomNext) * destRed[pixValIn];
                 outGreen = (xIPlPr - bottomNext) * destGreen[pixValIn];
                 outBlue  = (xIPlPr - bottomNext) * destBlue[pixValIn];
             }
         else
         {
             /*
              * The left boundary of the transformed source pixel is not
              * flush with that of the destination pixel.
              */
             if ((xIPlPr < top) && (xIPlPr < top))
             {
                 /* completely enclosed .. no hPass'ed pixel is available yet */
                 outRed += (xIPlPr - xIPr) * destRed[pixValIn];
```

Jun  7 09:51 1991   xformPerform.c.doc code Page 10

```
            outGreen += (xIPIPr - xIPr) * destGreen[pixValIn];
            outBlue  += (xIPIPr - xIPr) * destBlue[pixValIn];
            }
        else
            {
            /* the other cases .. at least one hPass'ed pixel is available */
            outRed   += (top - xIPr) * destRed[pixValIn];
            outGreen += (top - xIPr) * destGreen[pixValIn];
            outBlue  += (top - xIPr) * destBlue[pixValIn];

outRedVal[0]   = irint (outRed);
            outGreenVal[0] = irint (outGreen);
            outBlueVal[0]  = irint (outBlue);

/* Pass the hPass'ed pixel on to the vPass */
            vPass ((int) bottom, outRedVal, outGreenVal, outBlueVal);

/*
             * Predict the y' of the next hPass'ed pixel.
             * Give the multiple "b-shift".
             */
            /* REFER TO HPASS ALGORITHM */
            yIPr = yZeroPr + ((1 + indxX - Xpos) * xformMatrix[0][1]);

/* To be uncommented to view the hPass'ed image.
            pixValOut = loadCmap (outRedVal, outGreenVal, outBlueVal);
            pr_put (xform_pixrect_fin, (int) bottom, indxY, pixValOut);
*/
            /*
             * Since one hPass'ed pixel is output, need to increment bottom
             * to point to the next hPass'ed pixel.
             */
            bottom++;
            bottomNext = floor (xIPIPr);

if (bottomNext > top)
                {
                outRed   = destRed[pixValIn];
                outGreen = destGreen[pixValIn];
                outBlue  = destBlue[pixValIn];

outRedVal[0]   = irint (outRed);
                outGreenVal[0] = irint (outGreen);
                outBlueVal[0]  = irint (outBlue);

for (; bottom < bottomNext; bottom++)
                    {
                    /* The loop to process multiply hPass'ed pixels */
                    pixValOut = loadCmap (outRedVal, outGreenVal, outBlueVal);
                    pr_put (xform_pixrect_fin, (int) bottom, indxY, pixValOut);

/* To be uncommented to view the hPass'ed image.
*/
                    /* vPass this hPass'ed pixel. */
                    vPass ((int) bottom, outRedVal, outGreenVal, outBlueVal);
```

```
Jun  7 09:51 1991   xformPerform.c.doc+code Page 11

/*
                 * Predict the y' of the next hPass'ed pixel.
                 * Give the multiple "b-shift".
                 */
                /* REFER TO HPASS ALGORITHM */
                yIPr = yZeroPr + ((1 + IndxX - Xpos) * xformMatrix[0][1]);
            }

/* Save the overhang portion if any in the hPass buffer */
            outRed   = (xIP1Pr - bottomNext) * destRed[pixValIn];
            outGreen = (xIP1Pr - bottomNext) * destGreen[pixValIn];
            outBlue  = (xIP1Pr - bottomNext) * destBlue[pixValIn];
        }

/* For the next pixel, its x' is the predicted x' used so far */
        xIPr = xIP1Pr;
    }

/*
     * The y' of the first pixel of the next scanline is got by adding to its
     * original value the "d-shift". This value is also assigned to y1Pr.
     */
    yZeroPr += xformMatrix[1][1];
    y1Pr = yZeroPr;

/*
     * The x' of the first pixel of the next scanline is got by adding to its
     * original value the "c-shift". This value is also assigned to xIPr.
     */
    xZeroPr += xformMatrix[1][0];
    xIPr = xZeroPr;
}

/*
 * This routine performs the vPass on a hPass'ed pixel.
 * If a vPass'ed pixel is complete, this routine outputs it on the screen.
 * The parameters passed to it are the x co-ordinate of the screen pixel and the
 * value of the hPass'ed pixel.
 */
                /*****************************************/
                /*    REFER TO VPASS ALGORITHM           */
                /*****************************************/
vPass (xPr, hPassRed, hPassGreen, hPassBlue)
int xPr;
unsigned char hPassRed[1], hPassGreen[1], hPassBlue[1];
{
/*
 * Description of variables:
 * (Most of the varaiables have the same meaning as their counterparts in the hPass
 * phase)
 * xPr: x co-ordinate of destination screen pixel.
 * hPassRed, hPassGreen, hPassBlue: the pixel values of the hPass'ed pixel.
 * bottom: Y co-ordinate of the starting destination screen pixel due to the present
 *         hPass'ed pixel (floor (y1Pr)).
```

Jun  7 09:51 1991   xformPerform.c.doc+code  Page 12

```
 *      bottomNext: Y co-ordinate of the ending destination screen pixel due to the
 *              present hPass'ed pixel (ceil (yIPlPr)).
 *      top: Y co-ordinate of the screen pixel to the bottom of a destination pixel
 *              (ceil (yIPr)).
 *      outRedVal, outGreenVal, outBlueVal: the red, green, and blue values of the screen
 *              pixel.
 *      pixValOut: the pixel value (colormap index) of a screen pixel.. for display
 *              purposes.
 *      lineBuffer: the vPass scanline buffer.
 *      lineBufferIndx: Index into the scanline buffer.
 *      xPrBuf: x co-ordinate of the destination screen pixel after application of
 *              orthognality.
 *      bottomBuf: Y co-ordinate of the destination screen pixel after application of
 *              orthognality.
 */
double top, bottom, bottomNext, bottomBuf;
int pixValOut, xPrBuf;
unsigned char outRedVal[1], outGreenVal[1], outBlueVal[1];

/*
 * The index to the scanline buffer is set to the x co-ordinate of the screen pixel.
 * This makes things a lot easier as it does not involve any "normalizing".. in fact,
 * normalizing would be very difficult in rotations, especially if it were done
 * with the top-left pixel as being normalized to the zeroth index of the buffer, as
 * this could result in possible negative indices.
 */
lineBufferIndx = xPr;

/*
 * Calculate the "depth" of the present hPass'ed pixel, by giving it the "d shift"
 * This is done based upon the y' that has been computed during hPass.
 * Not too sure if this is correct.. should this computation be based on the y'?
 */
yIPlPr = yIPr + xformMatrix[1][1];

/* To be uncommented if debugging is required.
fprintf (fpout, "xPr = %d, yIPr = %f, yIPlPr = %f\n", xPr, yIPr, yIPlPr);
*/

/*
 * The jugglery on yIPr
 * yIPr is the yIPlPr value of the previous scanline. If the first scanline is being
 * operated upon, then yIPr is that computed during hPass, otherwise, it is copied
 * from the buffer. The newly computed yIPlPr is stored in the buffer.
 * The noVisit field is a field that is TRUE for the first scanline; for the others,
 * it is set to FALSE.
 */
if (lineBuffer[lineBufferIndx].noVisit == FALSE)
        /* Not the first scanline,.. so use the stored value */
        yIPr = lineBuffer[lineBufferIndx].yIPlPr;
lineBuffer[lineBufferIndx].yIPlPr = yIPlPr;

/* To be uncommented if debugging is required.
fprintf (fpout, "yIPr = %f, yIPr, yIPlPr);
*/
```

Jun 7 09:51 1991    xformPerform.c.doc:code Page 13

```
/* Compute top and bottom */
top = ceil (yiPr);
bottom = floor (yiPr);

if (top == bottom)
{
    /*
     * If top and bottom are same,
     * the top boundary of the hPass'ed pixel is flush with that
     * of the destination screen pixel.
     */
    if (yiPlPr < (top + 1.0))
    {
        /* completely enclosed .. no vPass'ed pixel is available yet */
        lineBuffer[lineBufferIndx].rVal = irInt ((yiPlPr - yiPr) * hPassRed[0]);
        lineBuffer[lineBufferIndx].gVal = irInt ((yiPlPr - yiPr) * hPassGreen[0]);
        lineBuffer[lineBufferIndx].bVal = irInt ((yiPlPr - yiPr) * hPassBlue[0]);
        /*
         * If this scanline is the first one (noVisit == TRUE), then s.t it to
         * FALSE, as the next scanline is obviously not the first one.
         */
        if (lineBuffer[lineBufferIndx].noVisit == "TRUE")
            lineBuffer[lineBufferIndx].noVisit = FALSE;
    }
    else
    {
        /* the other cases.. definite to have at least one vPass'ed screen pixel */
        bottomNext = floor (yiPlPr);

if (bottomNext > top)
        {
            /* The hPass'ed pixel occupies more than one screen pixel */
            outRedVal[0] = hPassRed[0];
            outGreenVal[0] = hPassGreen[0];
            outBlueVal[0] = hPassBlue[0];

for (; bottom < bottomNext; bottom++)
            {
                /*
                 * A complete screen pixel is available.
                 * So, load the colormap, and output the screen pixel.
                 */
                pixValOut = loadCmap (outRedVal, outGreenVal, outBlueVal);

/* Providing the othognality information */
                /* Refer to math on orthognality amount calculation */
                switch (orthAmt) {
                case (90):
                    xPrBuf = (int) bottom + xCenterPr - yCenterPr;
                    bottomBuf = yCenterPr + xCenterPr - (double) xPr;
                    break;
                case (180):
                    xPrBuf = (int) (xCenterPr + xCenterPr - (double) xPr);
                    bottomBuf = yCenterPr + yCenterPr - (double) bottom;
                    break;
                case (270):
                    xPrBuf = (int) (yCenterPr + xCenterPr - (double) bottom);
```

Jun 7 09:51 1991 xformPerform.c.doc:code Page 14

```
                                bottomBuf = xPr | yCenterPr - xCenterPr;
                                break;
                            case (0):
                            case (360):
                                xPrBuf = xPr;
                                bottomBuf = bottom;
                                break;
                            default:
                                break;
                        } pr_put (xform_pixrect_fin, xPrBuf, xPrBuf, (int) bottomBuf, (int) bottomBuf, pixValOut);
/* To be uncommented if debugging is required.
 */
                        fprintf (fpout, "%d %d = %d\t %d %d %d\n", xPrBuf, xPrBuf, (int) bottomBuf, pixValOut, destRed[pixValOut], destGreen[pixValOut], destBlue|

/* Place the "over-hang" portion if any into the vPass buffer */
                        lineBuffer[lineBufferIndx].rVal = lrint ((yIPlPr - bottomNext) * hPassRed[0]);
                        lineBuffer[lineBufferIndx].gVal = lrint ((yIPlPr - bottomNext) * hPassGreen[0]);
                        lineBuffer[lineBufferIndx].bVal = lrint ((yIPlPr - bottomNext) * hPassBlue[0]);
                        if (lineBuffer[lineBufferIndx].noVisit == TRUE)
                            lineBuffer[lineBufferIndx].noVisit = FALSE;
                    }
                }
                else
                {
                    /*
                     * The top boundary of the vPass'ed pixel is not flush with that of the
                     * screen pixel.
                     */
                    if ((yIPr < top) && (yIPlPr < top))
                    {
                        /* completely enclosed .. no vPass'ed pixel is available yet */
                        if (lineBuffer[lineBufferIndx].noVisit == TRUE)
                        {
                            /* This is code that involves inclusion of the background area */
                            lineBuffer[lineBufferIndx].rVal = (yIPr - bottom) * 255.0;
                            lineBuffer[lineBufferIndx].gVal = (yIPr - bottom) * 255.0;
                            lineBuffer[lineBufferIndx].bVal = (yIPr - bottom) * 255.0;
                            lineBuffer[lineBufferIndx].noVisit = FALSE;
                        }
                        /* Include the value of the hPass'ed pixel */
                        lineBuffer[lineBufferIndx].rVal += (yIPlPr - yIPr) * hPassRed[0];
                        lineBuffer[lineBufferIndx].gVal += (yIPlPr - yIPr) * hPassGreen[0];
                        lineBuffer[lineBufferIndx].bVal += (yIPlPr - yIPr) * hPassBlue[0];
                    }
                    else
                    {
                        /* the other cases .. at least one vPass'ed pixel is available */
                        if (lineBuffer[lineBufferIndx].noVisit == TRUE)
                        {
                            /* This is code that involves inclusion of the background area */
                            lineBuffer[lineBufferIndx].rVal = (yIPr - bottom) * 255.0;
                            lineBuffer[lineBufferIndx].gVal = (yIPr - bottom) * 255.0;
                            lineBuffer[lineBufferIndx].bVal = (yIPr - bottom) * 255.0;
```

Jun 7 09:51 1991 xformPerform.c.doc+code Page 15

```
            lineBuffer[lineBufferIndx].noVisit = FALSE;
            }

/* Include the value of the hPass'ed pixel */
        lineBuffer[lineBufferIndx].rVal += (top - yIPr) * hPassRed[0];
        lineBuffer[lineBufferIndx].gVal += (top - yIPr) * hPassGreen[0];
        lineBuffer[lineBufferIndx].bVal += (top - yIPr) * hPassBlue[0];

/* A screen pixel is ready to be output */
        outRedVal[0]   = lineBuffer[lineBufferIndx].rVal;
        outGreenVal[0] = lineBuffer[lineBufferIndx].gVal;
        outBlueVal[0]  = lineBuffer[lineBufferIndx].bVal;

pixValOut = loadCmap (outRedVal, outGreenVal, outBlueVal);

/* Providing the orthogonality amount */
        /* Refer to math on orthogonality */
        switch (orthAmt) {
            case (90):
                xPrBuf = (int) bottom + xCenterPr - yCenterPr;
                bottomBuf = yCenterPr + xCenterPr - (double) xPr;
                break;
            case (180):
                xPrBuf = (int) (xCenterPr + xCenterPr - (double) xPr);
                bottomBuf = yCenterPr + yCenterPr - (double) bottom;
                break;
            case (270):
                xPrBuf = (int) (yCenterPr + xCenterPr - (double) bottom);
                bottomBuf = xPr + yCenterPr - xCenterPr;
                break;
            case (0):
            case (360):
                xPrBuf = xPr;
                bottomBuf = bottom;
                break;
            default:
                break;
            } pr_put (xform_pixrect_fin, xPrBuf, (int) bottomBuf, pixValOut);
/* To be uncommented if debugging is required.
        fprintf (fpout, "%d %d = %d\L %d %d %d\n", xPrBuf, (int) bottomBuf, pixValOut, destRed[pixValOut], destGreen[pixValOut], destBlue[pixValo
*/

/*
         * There could possibly be some more screen pixels to be output,
         * so increment the y co-ordinate.
         * bottomNext gives the y co-ordinate of the last screen pixel to be output.
         */
        bottom++;
        bottomNext = floor (yIPIPr);

if (bottomNext > top)
            {
            /* The other screen pixels will take on the hPass'ed value as is */
            outRedVal[0]   = hPassRed[0];
            outGreenVal[0] = hPassGreen[0];
```

```
Jun  7 09:51 1991   xformPerform.c.doc+code Page 16 outBlueVal[0] = hPassBlue[0];

for (; bottom < bottomNext; bottom++)
    {
        /* A loop to output the other screen pixels */
        pixValOut = loadCmap (outRedVal, outGreenVal, outBlueVal);

/* Providing the orthognality amount */
        /* Refer to math on orthognality */
        switch (orthAmt) {
            case (90):
                xPrBuf = (int) bottom + xCenterPr - yCenterPr;
                bottomBuf = yCenterPr + xCenterPr - (double) xPr;
                break;
            case (180):
                xPrBuf = (int) (xCenterPr + xCenterPr - (double) xPr);
                bottomBuf = yCenterPr + yCenterPr - (double) bottom;
                break;
            case (270):
                xPrBuf = (int) (yCenterPr + xCenterPr - (double) bottom);
                bottomBuf = xPr + yCenterPr - xCenterPr;
                break;
            case (0):
            case (360):
                xPrBuf = xPr;
                bottomBuf = bottom;
                break;
            default:
                break;
        } pr_put (xform_pixrect_fin, xPrBuf, (int) bottomBuf, pixValOut);
/* To be uncommented if debugging is required.
        fprintf (fpout, "%d %d = %d\t %d %d %d\n", xPrBuf, (int) bottomBuf, pixValOut, destRed[pixValOut], destGreen[pixValOut], destBlue
*/

/* Save the overhang portion if any in the vPass buffer */
        lineBuffer[lineBufferIndx].rVal = (yiPiPr - bottomNext) * hPassRed[0];
        lineBuffer[lineBufferIndx].gVal = (yiPiPr - bottomNext) * hPassGreen[0];
        lineBuffer[lineBufferIndx].bVal = (yiPiPr - bottomNext) * hPassBlue[0];
        if (lineBuffer[lineBufferIndx].noVisit == TRUE)
            lineBuffer[lineBufferIndx].noVisit = FALSE;
    }
}

/* A 1st order five-tap filter */
/* The coefficients prCoeff (middle), ltCoeff (left), rtCoeff (right), topCoeff (top),
 * and botCoeff (bot) can be set by the user. If the user does not specify them, the
 * default values are 1, 0, 0, 0, 0 respectively (no filtering is done).
 */
Filter (pixRect, pixValIn, indxX, indxY)
Pixrect *pixRect;
int pixValIn;
```

Jun  7 09:51 1991   xformPerform.c.doc+code Page 17

```
   int indxX, indxY;
{
   int pixValInLt, pixValInRt, pixValInTop, pixValInBot;
   double rtRedVal, rtGreenVal, rtBlueVal, ltRedVal, ltGreenVal, ltBlueVal, prRedVal, prGreenVal, prBlueVal;
   double topRedVal, topGreenVal, topBlueVal, botRedVal, botGreenVal, botBlueVal;
   double filterRedVal, filterGreenVal, filterBlueVal;
   unsigned char filterRed[1], filterGreen[1], filterBlue[1];

pixValInLt  = pr_get (pixRect, indxX-1, indxY);
   pixValInRt  = pr_get (pixRect, indxX+1, indxY);
   pixValInTop = pr_get (pixRect, indxX, indxY-1);
   pixValInBot = pr_get (pixRect, indxX, indxY+1);

rtRedVal   = (double) destRed[pixValInRt]   * (double) rtCoeff;
   rtGreenVal = (double) destGreen[pixValInRt] * (double) rtCoeff;
   rtBlueVal  = (double) destBlue[pixValInRt]  * (double) rtCoeff;

ltRedVal   = (double) destRed[pixValInLt]   * (double) ltCoeff;
   ltGreenVal = (double) destGreen[pixValInLt] * (double) ltCoeff;
   ltBlueVal  = (double) destBlue[pixValInLt]  * (double) ltCoeff;

topRedVal   = (double) destRed[pixValInTop]   * (double) topCoeff;
   topGreenVal = (double) destGreen[pixValInTop] * (double) topCoeff;
   topBlueVal  = (double) destBlue[pixValInTop]  * (double) topCoeff;

botRedVal   = (double) destRed[pixValInBot]   * (double) botCoeff;
   botGreenVal = (double) destGreen[pixValInBot] * (double) botCoeff;
   botBlueVal  = (double) destBlue[pixValInBot]  * (double) botCoeff;

prRedVal   = (double) destRed[pixValIn]   * (double) prCoeff;
   prGreenVal = (double) destGreen[pixValIn] * (double) prCoeff;
   prBlueVal  = (double) destBlue[pixValIn]  * (double) prCoeff;

filterRedVal   = rtRedVal   + ltRedVal   + prRedVal   + topRedVal   + botRedVal;
   filterGreenVal = rtGreenVal + ltGreenVal + prGreenVal + topGreenVal + botGreenVal;
   filterBlueVal  = rtBlueVal  + ltBlueVal  + prBlueVal  + topBlueVal  + botBlueVal;

filterRed[0]   = irint (filterRedVal);
   filterGreen[0] = irint (filterGreenVal);
   filterBlue[0]  = irint (filterBlueVal);

return (loadCmap (filterRed, filterGreen, filterBlue));
}
```

What is claimed is:

1. Method of transforming an input image in an input image space into an output image in an output image space according to an image transformation specification, wherein, said input image comprises a plurality of input pixels, each having an intensity value, arranged in a rectangular array in said input image space according to a two-dimensional rectilinear input coordinate system;

each input pixel has a horizontal and a vertical coordinate in the input coordinate system;

said output image comprises a plurality of output pixels, each having an intensity value, arranged in a rectangular array in said output image space according to a two-dimensional rectilinear output coordinate system;

each output pixel has a horizontal and a vertical coordinate in an output coordinate system;

said method comprising the steps of:

a) selecting an order of sequential input pixel processing such that input pixels are processed in rows, such that each subsequent input pixel in any given row is adjacent along one axis of the input image coordinate system to the input pixel coordinate system processed immediately previously, and such that each subsequent row of input pixels processed is adjacent along the other axis of the input image coordinate system to the row of input pixels processed immediately previously;

b) expressing said image transformation specification in three by three matrix format, thus forming an image transformation matrix having nine transformation coefficients, said coefficients corresponding to transformation values including scaling, rotation, and, shearing;

c) expressing the horizontal and vertical coordinates in input image space of a first input pixel as a vector quantity to compute horizontal and vertical coordinates in the output image space based on said image transformation matrix;

d) selecting a first number of input pixels according to said selected order of input pixel processing and calculating horizontal coordinates in output image space, relative to said horizontal coordinate of said first input pixel in output image space, of a like number of intermediate output metapixels, said metapixels corresponding to said first number of input pixels on a one-to-one basis and each of which have a common width and height, where said first number is equal to that number of intermediate output metapixels required to fill one output pixel in width;

e) adding the intensity values of all but a last of said first number of input pixels producing an intensity sum;

f) producing an intensity value which is stored into a horizontal partial pixel (HPP) by adding to the intensity sum the intensity value of the last of said first number of input pixels, scaled by an amount proportional to a first portion of a width of a last intermediate output metapixel corresponding the last of said first number of input pixels, said first portion being that which is required to complete filling of said one output pixel;

g) applying the intensity value of the last of said first number of input pixels scaled by an amount proportional to a second portion of said width which is equal to said width minus said first portion as an intensity value of an incomplete horizontal partial pixel (IHPP);

h) calculating the vertical coordinate, relative to said vertical coordinate of the first input pixel in output image space, of said last intermediate output metapixel, and determining its floor and ceiling values;

i) comparing the height and vertical coordinate of said last intermediate output metapixel with the height and vertical coordinate of a vertically nearest output pixel (OS), and determining if said last intermediate output metapixel crosses vertically into said vertically nearest output pixel;

j) if said last intermediate output metapixel crosses vertically into said vertically nearest output pixel (OS), adding the intensity value of the incomplete horizontal partial pixel (IHPP) to the intensity value of the horizontal partial pixel (HPP) and saving it as the intensity value of said vertically nearest output pixel (OS), scaled by an amount of said horizontal partial pixel (IHPP) which covers said vertically nearest output pixel (OS);

k) storing any remaining intensity value of said horizontal incomplete partial pixel (IHPP) into an incomplete output pixel (IOS);

l) repeating steps d) through k) until all input pixels have been processed; and m) converting any remaining incomplete output pixels into output pixels.

2. A method of transforming an input image in an input image space into an output image in output image space as in claim 1, wherein:

horizontal and vertical coordinates of an intermediate output metapixel corresponding to a first processed input pixel are determined by a complete matrix transformation of the coordinates of the first processed input pixel, and wherein the horizontal and vertical coordinates of all subsequent intermediate output metapixels are determined by adding selected transformation matrix coefficients to the coordinates of previously calculated intermediate output metapixel coordinates.

* * * * *